(12) United States Patent
Fortuna et al.

(10) Patent No.: US 8,452,791 B2
(45) Date of Patent: *May 28, 2013

(54) ADDING NEW INSTANCES TO A STRUCTURED PRESENTATION

(75) Inventors: Vinicius J. Fortuna, New York, NY (US); Andriy Bihun, Pine Bush, NY (US); Daniel Loreto, New Rochelle, NY (US); Elena Erbiceanu, Orlando, FL (US); Jeffrey C. Reynar, New York, NY (US); Andrew William Hogue, Ho-Ho-Kus, NJ (US); Ankur Bhargava, Cambridge, MA (US)

(73) Assignee: Google Inc., Mountain View, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 12/355,554

(22) Filed: Jan. 16, 2009

(65) Prior Publication Data

US 2010/0185654 A1 Jul. 22, 2010

(51) Int. Cl.
*G06F 7/00* (2006.01)
*G06F 17/30* (2006.01)

(52) U.S. Cl.
USPC .......................................... 707/765; 715/204

(58) Field of Classification Search
None
See application file for complete search history.

(56) References Cited

U.S. PATENT DOCUMENTS

| | | | |
|---|---|---|---|
| 3,576,983 A | 5/1971 | Cochran | |
| 4,269,492 A | 5/1981 | Engelsmann et al. | |
| 4,374,381 A | 2/1983 | Ng et al. | |
| 4,797,569 A | 1/1989 | Boyacigiller | |
| 4,837,422 A | 6/1989 | Dethloff et al. | |
| 4,968,873 A | 11/1990 | Dethloff et al. | |
| 5,255,356 A | 10/1993 | Michelman et al. | |
| 5,257,353 A | 10/1993 | Blanck et al. | |
| 5,263,126 A | 11/1993 | Chang | |
| 5,293,319 A | 3/1994 | DeSha et al. | |
| 5,308,303 A | 5/1994 | Rawls et al. | |
| 5,321,750 A | 6/1994 | Nadan | |
| 5,347,580 A | 9/1994 | Molva et al. | |
| 5,381,349 A | 1/1995 | Winter et al. | |
| 5,387,170 A | 2/1995 | Rawls et al. | |
| 5,396,588 A | 3/1995 | Froessl | |
| 5,448,717 A | 9/1995 | Balmer et al. | |
| 5,473,732 A | 12/1995 | Chang | |

(Continued)

FOREIGN PATENT DOCUMENTS

WO       WO 01/19160      3/2001

OTHER PUBLICATIONS

A Relational Approach to Inrementally Extracting and Querying Structure in Unstructure Data, Chu et al, VLDB'07, Sep. 23-27, 2007.*

(Continued)

*Primary Examiner* — Augustine K Obisesan
(74) *Attorney, Agent, or Firm* — Fish & Richardson P.C.

(57) ABSTRACT

Methods, systems, and apparatus, including computer programs stored on computer storage media, for retrieval and display of information from an electronic document collection. In one aspect, a machine-implemented method includes the actions of receiving description data describing a preexisting structured presentation, comparing characteristics of the preexisting structured presentation with content of electronic documents in an unstructured collection of electronic documents to locate electronic documents that identify a new instance that is relevant to the preexisting structured presentation, adding an identifier of the new instance to the preexisting structured presentation to form an expanded structured presentation, and outputting instructions for presenting the expanded structured presentation.

49 Claims, 17 Drawing Sheets

U.S. PATENT DOCUMENTS

| | | | |
|---|---|---|---|
| 5,494,097 | A | 2/1996 | Straub et al. |
| 5,499,366 | A | 3/1996 | Rosenberg et al. |
| 5,560,006 | A | 9/1996 | Layden et al. |
| 5,577,510 | A | 11/1996 | Chittum et al. |
| 5,586,252 | A | 12/1996 | Barnard et al. |
| 5,634,054 | A | 5/1997 | Sarachan |
| 5,671,326 | A | 9/1997 | Geisow et al. |
| 5,682,035 | A | 10/1997 | Gallagher et al. |
| 5,694,608 | A | 12/1997 | Shostak |
| 5,696,962 | A | 12/1997 | Kupiec |
| 5,768,158 | A | 6/1998 | Adler et al. |
| 5,805,164 | A | 9/1998 | Blum et al. |
| 5,870,749 | A | 2/1999 | Adusumilli |
| 5,893,125 | A | 4/1999 | Shostak |
| 5,923,330 | A | 7/1999 | Tarlton et al. |
| 6,003,027 | A | 12/1999 | Prager |
| 6,057,935 | A | 5/2000 | Freeman |
| 6,122,647 | A | 9/2000 | Horowitz et al. |
| 6,298,357 | B1 * | 10/2001 | Wexler et al. ............ 715/210 |
| 6,304,259 | B1 | 10/2001 | DeStefano |
| 6,424,976 | B1 | 7/2002 | Jarvis et al. |
| 6,446,099 | B1 * | 9/2002 | Peairs ............ 715/210 |
| 6,476,827 | B1 | 11/2002 | Porter |
| 6,564,213 | B1 | 5/2003 | Ortega et al. |
| 6,574,628 | B1 | 6/2003 | Kahn et al. |
| 6,647,383 | B1 | 11/2003 | August et al. |
| 6,681,370 | B2 | 1/2004 | Gounares et al. |
| 6,687,689 | B1 | 2/2004 | Fung et al. |
| 6,694,307 | B2 | 2/2004 | Julien et al. |
| 6,704,727 | B1 | 3/2004 | Kravets |
| 6,728,707 | B1 | 4/2004 | Wakefield et al. |
| 6,732,097 | B1 | 5/2004 | Wakefield et al. |
| 6,732,098 | B1 | 5/2004 | Wakefield et al. |
| 6,738,765 | B1 | 5/2004 | Wakefield et al. |
| 6,741,988 | B1 | 5/2004 | Wakefield et al. |
| 6,826,443 | B2 * | 11/2004 | Makinen ............ 700/121 |
| 6,945,458 | B1 | 9/2005 | Shah et al. |
| 7,123,974 | B1 | 10/2006 | Hamilton |
| 7,225,197 | B2 | 5/2007 | Lissar et al. |
| 7,281,245 | B2 | 10/2007 | Reynar et al. |
| 7,325,194 | B2 | 1/2008 | Moore et al. |
| 7,346,629 | B2 | 3/2008 | Kapur |
| 7,356,537 | B2 | 4/2008 | Reynar et al. |
| 7,370,072 | B2 | 5/2008 | Jessen |
| 7,392,479 | B2 | 6/2008 | Jones et al. |
| 7,398,201 | B2 | 7/2008 | Marchisio et al. |
| 7,409,393 | B2 | 8/2008 | Gregoire et al. |
| 7,415,460 | B1 | 8/2008 | Phillips et al. |
| 7,421,645 | B2 | 9/2008 | Reynar |
| 7,526,425 | B2 | 4/2009 | Marchisio et al. |
| 7,526,486 | B2 | 4/2009 | Cushman, II et al. |
| 7,558,841 | B2 | 7/2009 | Taboada et al. |
| 7,562,104 | B2 | 7/2009 | Cadiz et al. |
| 7,593,925 | B2 | 9/2009 | Cadiz et al. |
| 7,672,932 | B2 | 3/2010 | Hood et al. |
| 7,707,024 | B2 | 4/2010 | Arayasantiparb et al. |
| 7,707,496 | B1 | 4/2010 | Moore et al. |
| 7,707,505 | B1 | 4/2010 | Ohrt et al. |
| 7,711,550 | B1 | 5/2010 | Feinberg et al. |
| 7,712,024 | B2 | 5/2010 | Reynar et al. |
| 7,716,163 | B2 | 5/2010 | Reynar et al. |
| 7,716,676 | B2 | 5/2010 | Sawicki et al. |
| 7,734,606 | B2 | 6/2010 | Walker |
| 7,739,588 | B2 | 6/2010 | Reynar et al. |
| 7,742,048 | B1 | 6/2010 | Moore et al. |
| 7,770,102 | B1 | 8/2010 | Wolff et al. |
| 7,778,816 | B2 | 8/2010 | Reynar |
| 7,783,614 | B2 | 8/2010 | Jones et al. |
| 7,788,590 | B2 | 8/2010 | Taboada et al. |
| 7,788,602 | B2 | 8/2010 | Reynar et al. |
| 7,792,818 | B2 | 9/2010 | Fain et al. |
| 7,814,084 | B2 | 10/2010 | Hallett et al. |
| 7,827,164 | B2 | 11/2010 | Stevenson |
| 7,827,546 | B1 | 11/2010 | Jones et al. |
| 7,836,044 | B2 | 11/2010 | Kamvar et al. |
| 7,840,604 | B2 | 11/2010 | Zhu et al. |
| 7,849,048 | B2 | 12/2010 | Langseth et al. |
| 7,849,049 | B2 | 12/2010 | Langseth et al. |
| 7,865,478 | B2 | 1/2011 | Badovinatz et al. |
| 7,895,175 | B2 | 2/2011 | Kumar |
| 7,912,816 | B2 | 3/2011 | Guha et al. |
| 7,992,085 | B2 | 8/2011 | Wang-Aryattanwanich et al. |
| 8,166,019 | B1 * | 4/2012 | Lee et al. ............ 707/708 |
| 2001/0025353 | A1 | 9/2001 | Jakel |
| 2001/0032234 | A1 | 10/2001 | Summers et al. |
| 2002/0032671 | A1 * | 3/2002 | Iinuma ............ 707/1 |
| 2002/0107853 | A1 | 8/2002 | Hofmann et al. |
| 2002/0111951 | A1 | 8/2002 | Zen |
| 2002/0129011 | A1 | 9/2002 | Julien |
| 2002/0156771 | A1 | 10/2002 | Frieder et al. |
| 2002/0187815 | A1 | 12/2002 | Deeds et al. |
| 2002/0194166 | A1 | 12/2002 | Fowler |
| 2003/0014441 | A1 | 1/2003 | Suzuki et al. |
| 2003/0016943 | A1 | 1/2003 | Chung et al. |
| 2003/0033275 | A1 | 2/2003 | Alpha et al. |
| 2003/0037050 | A1 | 2/2003 | Monteverde |
| 2003/0101052 | A1 | 5/2003 | Chen et al. |
| 2003/0105884 | A1 * | 6/2003 | Upton ............ 709/318 |
| 2003/0120681 | A1 * | 6/2003 | Baclawski ............ 707/103 R |
| 2003/0145004 | A1 | 7/2003 | Egilsson et al. |
| 2003/0188009 | A1 | 10/2003 | Agarwalla et al. |
| 2003/0206201 | A1 | 11/2003 | Ly |
| 2003/0220913 | A1 | 11/2003 | Doganata et al. |
| 2004/0019536 | A1 | 1/2004 | Ashkenazi et al. |
| 2004/0103116 | A1 | 5/2004 | Palanisamy et al. |
| 2004/0117436 | A1 | 6/2004 | Newman et al. |
| 2004/0167870 | A1 | 8/2004 | Wakefield et al. |
| 2004/0167883 | A1 | 8/2004 | Wakefield et al. |
| 2004/0167884 | A1 | 8/2004 | Wakefield et al. |
| 2004/0167885 | A1 | 8/2004 | Wakefield et al. |
| 2004/0167886 | A1 | 8/2004 | Wakefield et al. |
| 2004/0167887 | A1 | 8/2004 | Wakefield et al. |
| 2004/0167907 | A1 | 8/2004 | Wakefield et al. |
| 2004/0167908 | A1 | 8/2004 | Wakefield et al. |
| 2004/0167909 | A1 | 8/2004 | Wakefield et al. |
| 2004/0167910 | A1 | 8/2004 | Wakefield et al. |
| 2004/0167911 | A1 | 8/2004 | Wakefield et al. |
| 2004/0167921 | A1 * | 8/2004 | Carson et al. ............ 707/102 |
| 2004/0181543 | A1 * | 9/2004 | Wu et al. ............ 707/102 |
| 2004/0186826 | A1 | 9/2004 | Chol et al. |
| 2004/0194009 | A1 | 9/2004 | LaComb et al. |
| 2004/0215634 | A1 | 10/2004 | Wakefield et al. |
| 2004/0243560 | A1 | 12/2004 | Broder et al. |
| 2005/0055337 | A1 | 3/2005 | Bebo et al. |
| 2005/0076015 | A1 | 4/2005 | Dettinger et al. |
| 2005/0080771 | A1 | 4/2005 | Fish |
| 2005/0086215 | A1 | 4/2005 | Perisic |
| 2005/0102259 | A1 | 5/2005 | Kapur |
| 2005/0108256 | A1 | 5/2005 | Wakefiled et al. |
| 2005/0132274 | A1 * | 6/2005 | Bodin et al. ............ 715/513 |
| 2005/0240984 | A1 | 10/2005 | Farr et al. |
| 2005/0289170 | A1 | 12/2005 | Brown et al. |
| 2006/0004716 | A1 | 1/2006 | Hurst et al. |
| 2006/0053383 | A1 | 3/2006 | Gauthier et al. |
| 2006/0074859 | A1 | 4/2006 | Gange et al. |
| 2006/0074868 | A1 | 4/2006 | Khaliq et al. |
| 2006/0129446 | A1 | 6/2006 | Ruhl et al. |
| 2006/0190436 | A1 | 8/2006 | Richardson et al. |
| 2007/0011183 | A1 | 1/2007 | Langseth et al. |
| 2007/0073849 | A1 * | 3/2007 | Baikov et al. ............ 709/220 |
| 2007/0078850 | A1 | 4/2007 | Aziz et al. |
| 2007/0203891 | A1 | 8/2007 | Solaro et al. |
| 2007/0244859 | A1 * | 10/2007 | Trippe et al. ............ 707/3 |
| 2007/0276845 | A1 | 11/2007 | Geilich |
| 2007/0282783 | A1 * | 12/2007 | Singh ............ 707/1 |
| 2008/0097985 | A1 | 4/2008 | Olstad et al. |
| 2008/0114795 | A1 * | 5/2008 | Agrawal et al. ............ 707/101 |
| 2008/0162456 | A1 * | 7/2008 | Daga et al. ............ 707/5 |
| 2008/0228675 | A1 | 9/2008 | Duffy et al. |
| 2008/0256023 | A1 | 10/2008 | Nair |
| 2008/0300097 | A1 | 12/2008 | Parkinson |
| 2010/0161661 | A1 | 6/2010 | Hood et al. |
| 2010/0185651 | A1 | 7/2010 | Crow et al. |
| 2010/0185653 | A1 | 7/2010 | Fortuna et al. |
| 2010/0185934 | A1 | 7/2010 | Fortuna et al. |

OTHER PUBLICATIONS

International Search Report as issued in PCT/US2010/036949 on Jan. 24, 2011.
Dontcheva, M., Drucker, S., Salesin, D., Cohen, M., "Relations, Cards, and Search Templates: User-Guided Data Integration and Layout," UIST '07, pp. 61-70 (Oct. 7-10, 2007).
B. Amento, L. Terveen, and W. Hill, Experiments in social data mining. The TopicShop system. ACM Trans. on Computer-Human Interaction, pp. 54-85 (2003).
S. Card, G. Roberston, and W. York, "The WebBook and the Web Forager: An information workspace for theWorld-WideWeb," Proc. of SIGCHI, pp. 111-117 (1996).
M. Dontcheva, S. M. Drucker, G.Wade, D. Salesin, and M. F. Cohen, "Summarizing personalWeb browsing sessions," Proc. of UIST, pp. 115-124 (2006).
A. Y. Halevy, A. Rajaraman, and J. J. Ordille. "Data integration: The teenage years," Proc. of VLDB, pp. 9-16 (2006).
A. Hogue and D. Karger, "Thresher: automating the unwrapping of semantic content from the World Wide Web," Proc. of WWW, pp. 86-95 (2005).
D. Huynh, S. Mazzocchi, and D. Karger, "Piggy Bank: Experience the semantic web inside your Web browser," Proc. of ISWC, pp. 413-430 (2005).
U. Irmak and T. Suel, "Interactive wrapper generation with minimal user effort," Proc. of WWW, pp. 553-563 (2006).
T. Kristjansson, A. Culotta, P. Viola, and A. McCallum, "Interactive information extraction with constrained conditional random fields," Proc. of AAAI, pp. 412-418 (2004).
J. Madhavan, S. Cohen, X. L. Dong, A. Y. Halevy, S. R. Jeffery, D. Ko, and C. Yu, "Web-scale data integration: You can afford to pay as you go," Proc. of CIDR, pp. 342-350 (2007).
G. Robertson, M. Czerwinski, K. Larson, D. Robbins, D. Thiel, and M. van Dantzich, "Data mountain: using spatial memory for document management," Proc. of UIST, pp. 153-162 (1998).
M. Schraefel, Y. Zhu, D. Modjeska, D. Wigdor, and S. Zhao, "Hunter Gatherer: interaction support for the creation and management of within-web-page collections," Proc. of WWW, pp. 172-181 (2002).
A. Sugiura and Y. Koseki, "Internet Scrapbook: automating Web browsing tasks by demonstration," Proc. of UIST, pp. 9-18 (1998).
P. Viola and M. Narasimhan, "Learning to extract information from semi-structured text using a discriminative context free grammar," Proc. of SIGIR, pp. 330-337 (2005).
S. Ye, T.-S. Chua, J. Kei, "Querying and Clustering Web Pages about Persons and Organizations," Proceedings of the IEEE/WIC International Conference on Web Intelligence (WI'03) (2003).
International Search Report as issued in PCT/US2010/021290 on Sep. 3, 2010.
K. Tokunaga, et al., "Automatic Discovery of Attribute Words from Web Documents," R. Dale et al. (Eds.): *IJCNLP 2005, LNAI 3651*, pp. 106-118, 2005, Springer-Verlag, Berlin, Heidelberg 2005.
Office Action as issued in U.S. Appl. No. 12/355,459 on Nov. 7, 2011.
Office Action as issued in U.S. Appl. No. 12/355,607 on Nov. 1, 2011.
Office Action as issued in U.S. Appl. No. 12/355,228 on Aug. 4, 2011.
Office Action as issued in U.S. Appl. No. 12/476,110 on Aug. 4, 2011.
International Search Report as issued in PCT/US2006/25810 on Jul. 27, 2007.
International Search Report as issued in PCT/US2006/25811 on Feb. 16, 2007.
Office Action as issued in U.S. Appl. No. 12/355,103 on May 2, 2011.
Office Action as issued in U.S. Appl. No. 12/355,228 on Jan. 5, 2011.
Office Action as issued in U.S. Appl. No. 12/355,459 on Mar. 25, 2011.
Office Action as issued in U.S. Appl. No. 12/355,607 on Mar. 1, 2011.
Barbara et al., Interoperability with unstructured data and services, Research Issues in Data Engineering, 1993: Interoperability in Multidatabase Systems, 1993. Proceedings RIDE-IMS '93, Third International Workshop on, Apr. 19-20, 1993, pp. 123-125.
Ontology-Based Extraction and Structuring of Information from Data-Rich Unstructured Documents, by D.W. Embley, D.M. Campbell, and R.D. Smith, CIKM'98 Proceedings (http://www.deg.byu.edu/papers/cikm98.pdf), Nov. 1998.
A Conceptual-Modeling Approach to Extracting Data from the Web, by D.W. Embley, D.M. Campbell, Y.S. Jiang, Y.-K. Ng, R.D. Smith, S.W. Liddle, and D.W. Quass, ER'98 Proceedings (http://www.deg.byu.edu/papers/e198.pdf), Nov. 1998.
A Conceptual-Model-Based Computational Alembic for a Web of Knowledge by D.W. Embley, S.W. Liddle, D. Lonsdale, G. Nagy, Y. Tijerino, R. Clawson, J. Crabtree, Y. Ding, P. Jha, Z. Lian, S. Lynn, R.K. Padmanabhan, J. Peters, C. Tao, R. Watts, C. Woodbury, and A. Zitzelberger, ER2008, Oct. 2008. (http://www.deg.byu.edu/papers/dke99.pdf).
Record Location and Reconfiguration in Unstructured Multiple-Record Web Documents, by D.W. Embley and L. Xu, WebDB'00 Proceedings (http://www.deg.byu.edu/papers/WebDB00.ps, May 2000.
Extracting Information from Heterogeneous Information Sources Using Ontologically Specified Target Views, by J. Biskup and D.W. Embley, Information Systems, vol. 28, No. 3, 2003, 169-212, May 2003.
Recognizing Ontology-Applicable Multiple-Record Web Documents, by D.W. Embley, Y.-K. Ng, and L. Xu, Proceedings of the 20th International Conference on Conceptual Modeling (er2001), Yokohama, Japan, Nov. 27-30, 2001.
Westermann et al., "The VSBUFFER: Visibility Ordering of Unstructured Volume Primitives by Polygon Drawing,", Oct. 1997. (http://citeseerx.ist.psu.edu/viewdoc/download;jsessionid=08847506C7710C023D15EC672071DE58?doi=10.1.1.29.9614&rep=rep1&type=pdf), Oct. 1997.
Modha, D. S. and Spangler, W. S. 2000. Clustering hypertext with applications to web searching. In Proceedings of the Eleventh ACM on Hypertext and Hypermedia (San Antonio, Texas, United States, May 30-Jun. 3, 2000). Hypertext '00. ACM Press, New York, NY, 143-152. DOI=http://doi.acm.org/10.1145/336296.336351.
Botafogo, R. A. 1993. Cluster analysis for hypertext systems. In Proceedings of the 16th Annual international ACM SIGIR Conference on Research and Development in information Retrieval (Pittsburgh, Pennsylvania, United States, Jun. 27-Jul. 1, 1993). R. Korfhage, E. Rasmussen, and P. Willett, Eds. SIGIR '93. ACM Press, New York, NY, 116-125, Jun. 27-Jul. 1, 1993.
Xiaofeng He; Ding, C.H.Q.; Hongyuan Zha; Simon, H.D., "Automatic topic identification using webpage clustering," Data Mining, 2001. ICDM 2001, Proceedings IEEE International Conference on, vol., No. pp. 195-202, 2001.

* cited by examiner

| INSTANCE_1 | LOCATION_2 | ATTR_2 | ATTR_3 | ATTR_5 | |
|---|---|---|---|---|---|
| INSTANCE_2 | LOCATION_2 | ATTR_5 | ATTR_6 | | |
| INSTANCE_2 | LOCATION_3 | ATTR_3 | ATTR_5 | ATTR_... | ATTR_N |
| INSTANCE_2 | LOCATION_4 | ATTR_3 | ATTR_4 | | |
| INSTANCE_2 | LOCATION_5 | ATTR_5 | ATTR_8 | ATTR_9 | |
| INSTANCE_... | LOCATION_... | ATTR_... | | | |
| INSTANCE_N | LOCATION_N | ATTR_... | ATTR_... | ATTR_... | ATTR_N |

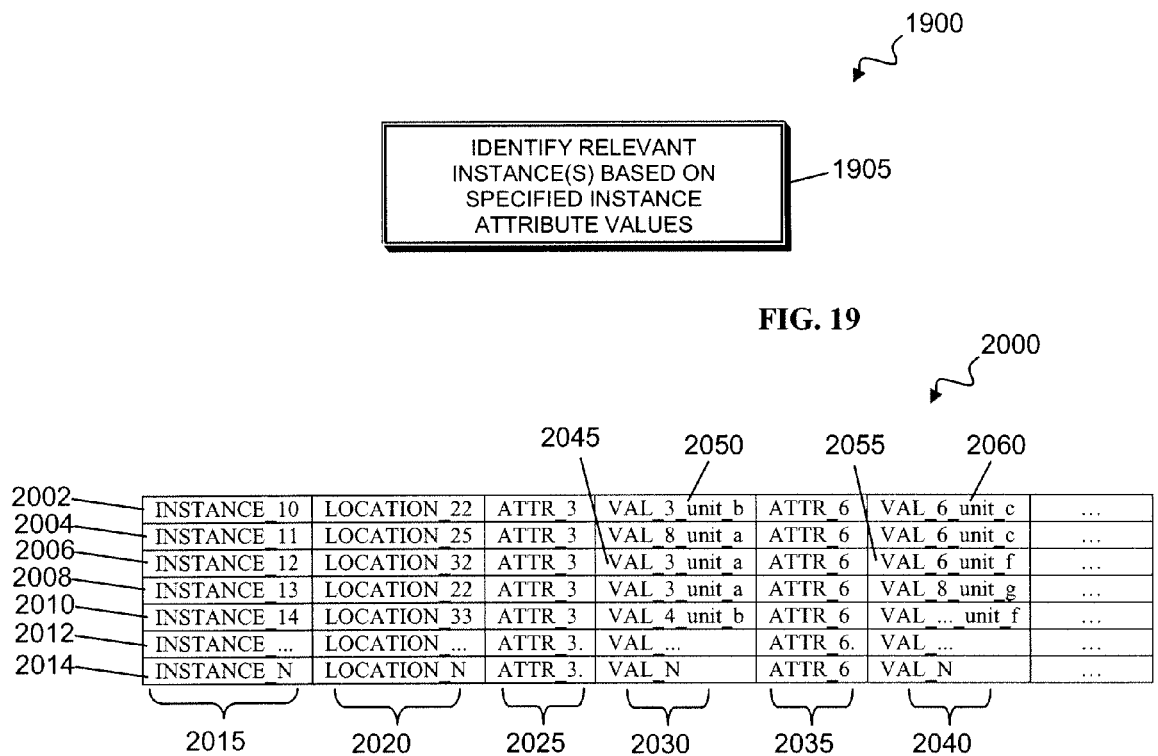
FIG. 19
FIG. 20
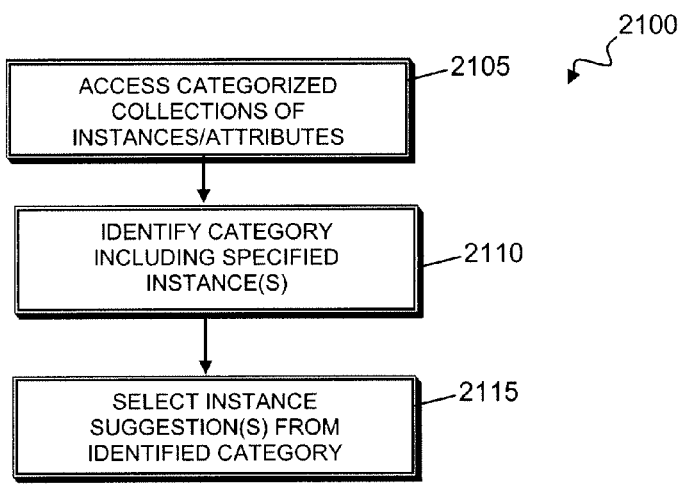
FIG. 21

ADDING NEW INSTANCES TO A STRUCTURED PRESENTATION

CROSS-REFERENCE TO RELATED APPLICATIONS

This specification refers to the commonly owned U.S. patent applications entitled "POPULATING A STRUCTURED PRESENTATION WITH NEW VALUES" Ser. No. 12/355,459, "ADDING NEW ATTRIBUTES TO A STRUCTURED PRESENTATION" Ser. No. 12/355,607, "RETRIEVING AND DISPLAYING INFORMATION FROM AN UNSTRUCTURED ELECTRONIC DOCUMENT COLLECTION" Ser. No. 12/355,228, and "EMBEDDING A CONCEALED SEARCH INTERFACE IN A STRUCTURED PRESENTATION" Ser. No. 12/355,103, all of which are filed on the same day as the present disclosure and the contents of all of which are incorporated herein by reference.

BACKGROUND

This specification relates to the addition of new instances to a structured presentation by retrieving and displaying information from an unstructured electronic document collection.

An electronic document is a collection of machine-readable data. Electronic documents are generally individual files and are formatted in accordance with a defined format (e.g., PDF, TIFF, HTML, ASCII, MS Word, PCL, PostScript, or the like). Electronic documents can be electronically stored and disseminated. In some cases, electronic documents include audio content, visual content, and other information, as well as text and links to other electronic documents.

Electronic document can be collected into electronic document collections. Electronic document collections can either be unstructured or structured. The formatting of the documents in an unstructured electronic document collection is not constrained to conform with a predetermined structure and can evolve in often unforeseen ways. In other words, the formatting of individual documents in an unstructured electronic document collection is neither restrictive nor permanent across the entire document collection. Further, in an unstructured electronic document collection, there are no mechanisms for ensuring that new documents adhere to a format or that changes to a format are applied to previously existing documents. Thus, the documents in an unstructured electronic document collection cannot be expected to share a common structure that can be exploited in the extraction of information. Examples of unstructured electronic document collections include the documents available on the Internet, collections of resumes, collections of journal articles, and collections of news articles. Documents in some unstructured electronic document collections are not prohibited from including links to other documents inside and outside of the collection.

In contrast, the documents in structured electronic document collections generally conform with formats that can be both restrictive and permanent. The formats imposed on documents in structured electronic document collections can be restrictive in that common formats are applied to all of the documents in the collections, even when the applied formats are not completely appropriate. The formats can be permanent in that an upfront commitment to a particular format by the party who assembles the structured electronic document collection is generally required. Further, users of the collections—in particular, programs that use the documents in the collection—rely on the documents' having the expected format. As a result, format changes can be difficult to implement. Structured electronic document collections are best suited to applications where the information content lends itself to simple and stable categorizations. Thus, the documents in a structured electronic document collection generally share a common structure that can be exploited in the extraction of information. Examples of structured electronic document collections include databases that are organized and viewed through a database management system (DBMS) in accordance with hierarchical and relational data models, as well as a collections of electronic documents that are created by a single entity for presenting information consistently. For example, a collection of web pages that are provided by an online bookseller to present information about individual books can form a structured electronic document collection. As another example, a collection of web pages that is created by server-side scripts and viewed through an application server can form a structured electronic document collection. Thus, one or more structured electronic document collections can each be a subset of an unstructured electronic document collection.

SUMMARY

This specification describes technologies relating to retrieval and display of information from an unstructured electronic document collection, for example, the electronic documents available on the Internet. Although an electronic document collection may be unstructured, the information content of the unstructured electronic document collection can be displayed in a structured presentation. In particular, the information content of an unstructured electronic document collection can be used not only to determine the values of attributes but also to identify, select, and name attributes and instances in a structured presentation. Such structured presentations can present information in a coherent manner to a user despite the diversity in sources. Examples of structured presentations include tables and other collections of records.

In general, one aspect of the subject matter described in this specification can be embodied in machine-implemented methods that include the actions of receiving description data describing a preexisting structured presentation, comparing characteristics of the preexisting structured presentation with content of electronic documents in an unstructured collection of electronic documents to locate electronic documents that identify a new instance that is relevant to the preexisting structured presentation, adding an identifier of the new instance to the preexisting structured presentation to form an expanded structured presentation, and outputting instructions for presenting the expanded structured presentation. A visual presentation of the preexisting structured presentation visually presenting information in a systematic arrangement that conforms with a structured design. The structured presentation associations between an instance and values that characterize attributes of the instance by virtue of an arrangement of an identifier of the instance and the values in a visual presentation of the structured presentation.

This and other aspects can include one or more of the following features. Adding the identifier of the new instance can include formulating a collection of instance suggestions, providing the instance suggestion collection to a user, and receiving a user selection of the new instance, wherein the new instance is in the collection of instance suggestions. Comparing the characteristics of the preexisting structured presentation with the content of the electronic documents can include identifying documents in the electronic document collection that include structured components related to instances identified in the preexisting structured presentation.

Formulating the collection of instance suggestions can include identifying a first document in the electronic document collection that includes an identifier of an instance identified in the preexisting structured presentation and that is arranged in accordance with a template, identifying a second document that is arranged in accordance with the template but relevant to a second instance, and including the second instance in the instance suggestion collection.

Comparing the characteristics of the preexisting structured presentation with the content of the electronic documents can include one or more of the following: identifying documents in the electronic document collection that include information regarding one or more instances in the preexisting structured presentation, locating the new instance in a stored collection of associations of instances with attributes, comparing the characteristics of the preexisting structured presentation with the attributes characterized in the preexisting structured presentation, comparing the attributes used to characterize instances in the preexisting structured presentation with the content of the electronic documents, comparing the value of attributes used to characterize instances in the preexisting structured presentation with the content of the electronic documents, and comparing a category of instances that includes instances in the preexisting structured presentation with the content of the electronic documents.

The collection of electronic documents can include the electronic documents available on the Internet. The electronic documents can include web pages. The expanded structured presentation can include a table or a collection of cards. The method can include visually displaying the expanded structured presentation on a display screen, including physically transforming one or more elements of the display screen.

Other embodiments of this aspect include corresponding systems, apparatus, and computer programs recorded on computer storage devices, each configured to perform the operations of the methods.

Another aspect of the subject matter described in this specification can be embodied in apparatuses that include one or more machine-readable data storage media storing instructions operable to cause one or more data processing machines to perform operations. The operations include formulating a collection of instance suggestions based on content of two or more documents in an unstructured electronic document collection, providing the instance suggestion collection to a user, receiving a user selection of a first instance in the collection of instance suggestions, and adding an identifier of the first instance suggestion to a structured presentation. The electronic document collection is unstructured in that the format of the electronic documents in the electronic document collection is neither restrictive nor permanent. A visual presentation of the structured presentation visually presents information in an organized arrangement. The structured presentation denotes associations between an instance and values that characterize attributes of the instance by virtue of an arrangement of an identifier of the instance and the values in the visual presentation of the structured presentation.

This and other aspects can include one or more of the following features. Formulating the collection of instance suggestions can include one or more of the following: comparing characteristics of a preexisting structured presentation with content of electronic documents in the electronic document collection; identifying documents in the electronic document collection that include structured components related to instances identified in the preexisting structured presentation; identifying a first document in the electronic document collection that is relevant to an instance identified in the preexisting structured presentation and that is arranged in accordance with a template, identifying a second document that is arranged in accordance with the template but relevant to the a second instance, and including the second instance in the instance suggestion collection; identifying documents in the electronic document collection that include identifiers of one or more instances in the preexisting structured presentation, identifying additional attributes used to characterize instances in the preexisting structured presentation; comparing values of attributes used to characterize instances in the preexisting structured presentation with values of the instance suggestions; identifying a category of instances that includes instances in the preexisting structured presentation and formulating the collection of instance suggestions using instances in the category of instances; identifying the instance suggestions in a stored collection of associations of instances with attributes; and comparing the attributes characterized in the preexisting structured presentation with the content of the documents in the unstructured electronic document collection.

The collection of electronic documents can include the documents available on the Internet. The electronic documents can include web pages. The structured presentation can include a table or a collection of cards.

Other embodiments of this aspect include corresponding systems, apparatus, and methods.

Another aspect of the subject matter described in this specification can be embodied in a system that includes a client device and one or more computers programmed to interact with the client device and to perform operations. The operations include receiving description data describing a preexisting structured presentation, comparing characteristics of the preexisting structured presentation with content of electronic documents in an unstructured collection of electronic documents to locate electronic documents that identify a new instance that is relevant to the preexisting structured presentation, adding an identifier of the new instance to the preexisting structured presentation to form an expanded structured presentation, and outputting instructions for presenting the expanded structured presentation on a display device coupled in data communication with the client device. A visual presentation of the preexisting structured presentation visually presenting information in a systematic arrangement that conforms with a structured design. The structured presentation denoting associations between an instance and values that characterize attributes of the instance by virtue of an arrangement of an identifier of the instance and the values in a visual presentation of the structured presentation.

Other embodiments of this aspect include corresponding computer program products, apparatus, and methods.

Another aspect of the subject matter described in this specification can be embodied in a system that includes a client device and one or more computers programmed to interact with the client device and to perform operations. The operations include formulating a collection of instance suggestions based on content of two or more documents in an unstructured electronic document collection, providing the instance suggestion collection to a user using the client device, receiving a user selection of a first instance in the collection of instance suggestions, and adding an identifier of the first instance suggestion to a structured presentation presented on a display device coupled in data communication with the client device, wherein a visual presentation of the structured presentation visually presents information in an organized arrangement. The electronic document collection is unstructured in that the format of the electronic documents in the electronic document collection is neither restrictive nor permanent. The structured presentation denotes associations between an instance and values that characterize attributes of the instance by virtue of an arrangement of an identifier of the instance and the values in the visual presentation of the structured presentation.

This and other aspects can include one or more of the following features. The one or more computers can include a server operable to interact with the client device through a data communication network. The client device can be operable to interact with the server as a client. The client device can include a personal computer running a web browser. The personal computer can include the display device.

Other embodiments of this aspect include corresponding computer program products, apparatus, and methods.

The details of one or more implementations are set forth in the accompanying drawings and the description below. Other features and advantages will be apparent from the description and drawings, and from the claims.

DESCRIPTION OF DRAWINGS

FIG. 19 is a flow chart of a process for formulating a collection of new instance suggestions based on information in a preexisting structured presentation.

FIG. 20 is a schematic representation of a table that associates attributes, instances, and their values in data collection.

FIG. 21 is a flow chart of a process for formulating a collection of new instance suggestions based on information in a preexisting structured presentation.

Like reference symbols in the various drawings indicate like elements.

DETAILED DESCRIPTION

Figure 1:
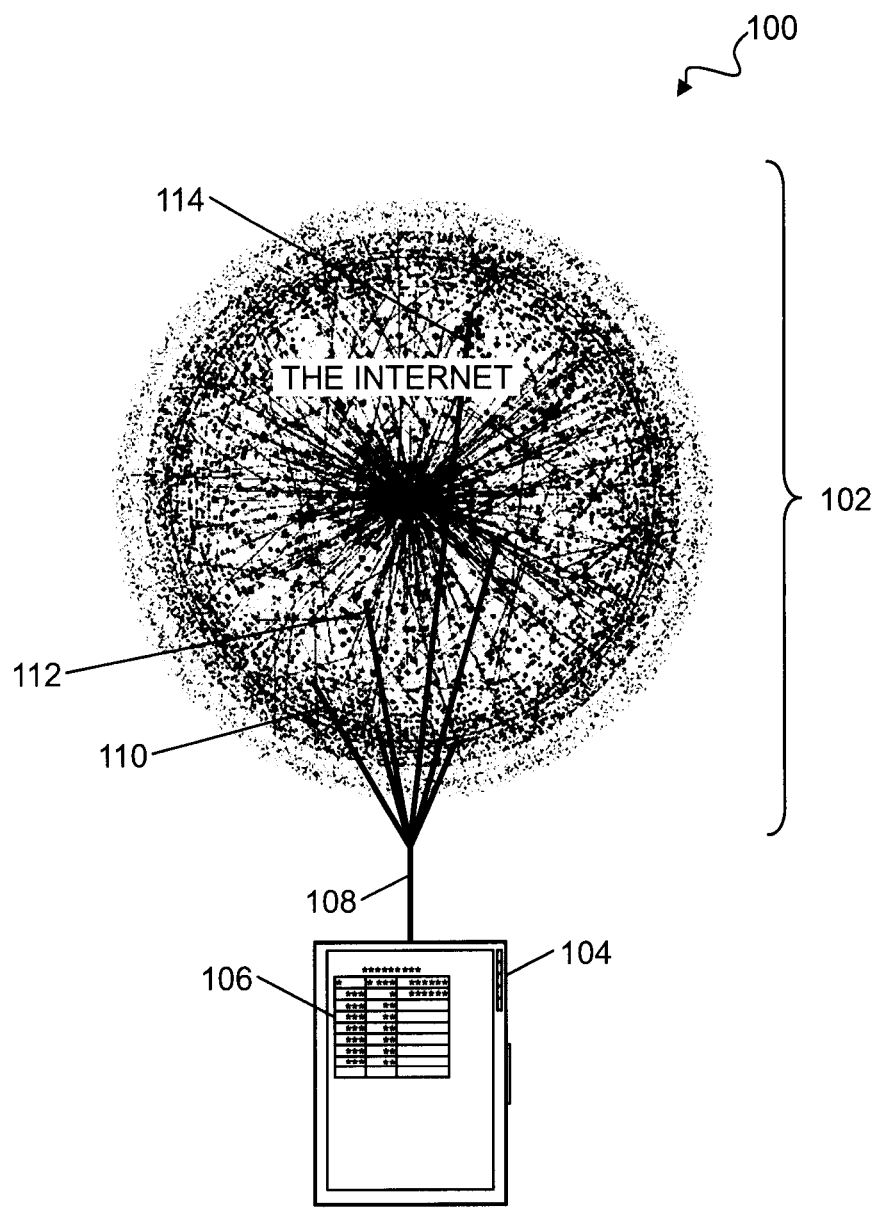
FIG. 1 is a schematic representation of a system in which information from an electronic document collection is presented to a user in a structured presentation.

FIG. 1 is a schematic representation of a system 100 in which information from an unstructured electronic document collection 102 is presented to a user in a structured presentation 106. In addition to electronic document collection 102, system 100 includes a display screen 104 and a data communication infrastructure 108. In operation, system 100 extracts information from unstructured collection of electronic documents 102 and presents the extracted information in a structured presentation 106 on display screen 104.

Electronic document collection 102 is unstructured in that the organization of information within individual documents in electronic document collection 102 need not conform with a predetermined structure that can be exploited in the extraction of information. For example, consider three electronic documents in electronic document collection 102, namely, electronic documents 110, 112, 114. Documents 110, 112, 114 were added to collection 102 by three different users who organize the content of their respective electronic documents differently. The users need not collaborate to ensure that information within documents 110, 112, 114 is in a particular format. Moreover, if one user wishes to change the format of document 110, the user can do so without regard for the format of the documents added by the other users. There is no need for the user to inform the other users of the change. Indeed, in some cases, documents can be added to collection 102 by entities who not only fail to collaborate but who are also competitors who are adverse to one another, such as three different car manufacturers or three different sellers of digital cameras. Regardless of the particular alignment of the entities who add documents to collection 102, no mechanism (e.g., formatting software component or filtering software) is associated with collection 102 that ensures that the information in documents is similarly organized within the documents. Further, no mechanism is associated with collection 102 that ensures that the organization of information in each of each document in collection 102 remains unchanged.

In contrast, structured presentation 106 is structured and presents information drawn from documents in collection 102 in an organized, systematic arrangement. Thus, the grouping, segmentation, and arrangement of information in structured presentation 106 conforms with a structured design even when the information in the presentation is drawn from different contexts in a diverse set of documents in collection 102. Further, changes to any aspect of the design of structured presentation 106 can be propagated throughout structured presentation 106.

Examples of structured presentations include spreadsheet tables, collections of structured cards or other records, and other structured presentation formats. Such structured presentations can also conform with rules that specify the spatial arrangement of information in the displays, the positioning and identification of various organizational and informational aspects (e.g., column headers, row headers, unit identifiers, and the like) of the structured presentations, the graphical representation of values, and other characteristics.

The structuring of information in structured presentations generally facilitates the understanding of the information by a viewer. For example, a viewer can discern the nature of the information contained within the structured presentation by reading headers. A viewer of can easily identify and compare values presented in the structured presentation based on the arrangement and positioning of those values in the display. For example, a user can easily ascertain that certain values in a structured presentation all relate to attributes (i.e., characteristics) of different cars and can easily compare those values.

System 100 is not limited to merely populating structured presentation 106 with values drawn from documents in collection 102. Instead, in many implementations, system 100 can determine entities (i.e., "instances") that are to be described in structured presentation 106, values that characterize the attributes of those instances, as well as an appropriate structuring of structured presentation 106. Such determinations can be based on information drawn from different documents in collection 102 that are not restricted to having a specific format, a permanent format, or both. For example, the attributes that appear in structured presentation 106 can be based on the attributes used in documents in collection 102 to characterize certain instances, as discussed further below. As another example, the units of the values (e.g., meters, feet, inches, miles) that appear in structured presentation 106 can be based on the units of the values that appear in documents in collection 102. As another example, the instances that appear in structured presentation 106 can be determined based on instances that appear in documents in collection 102.

Further, in many implementations, such information can be drawn from previously unspecified documents in collection 102. For example, a search query can be used to identify documents in collection 102 and the information can be drawn from these documents. There need not be preexisting limits on the identity or type of documents from which information can be drawn. For example, the identified documents need not be limited to being associated with the account of a particular individual or originating from a particular retailer. Instead, the information can be drawn from previously unspecified documents.

System 100 can thus exploit the diverse information content of documents in collection 102 in a variety of different ways to present a structured presentation to a user. In cases where electronic document collection 102 includes a large number of documents, the amount of information that can be exploited can be very large. Moreover, in many cases, this can be done automatically or with a relatively small amount of human interaction, as discussed further below.

Figure 2:
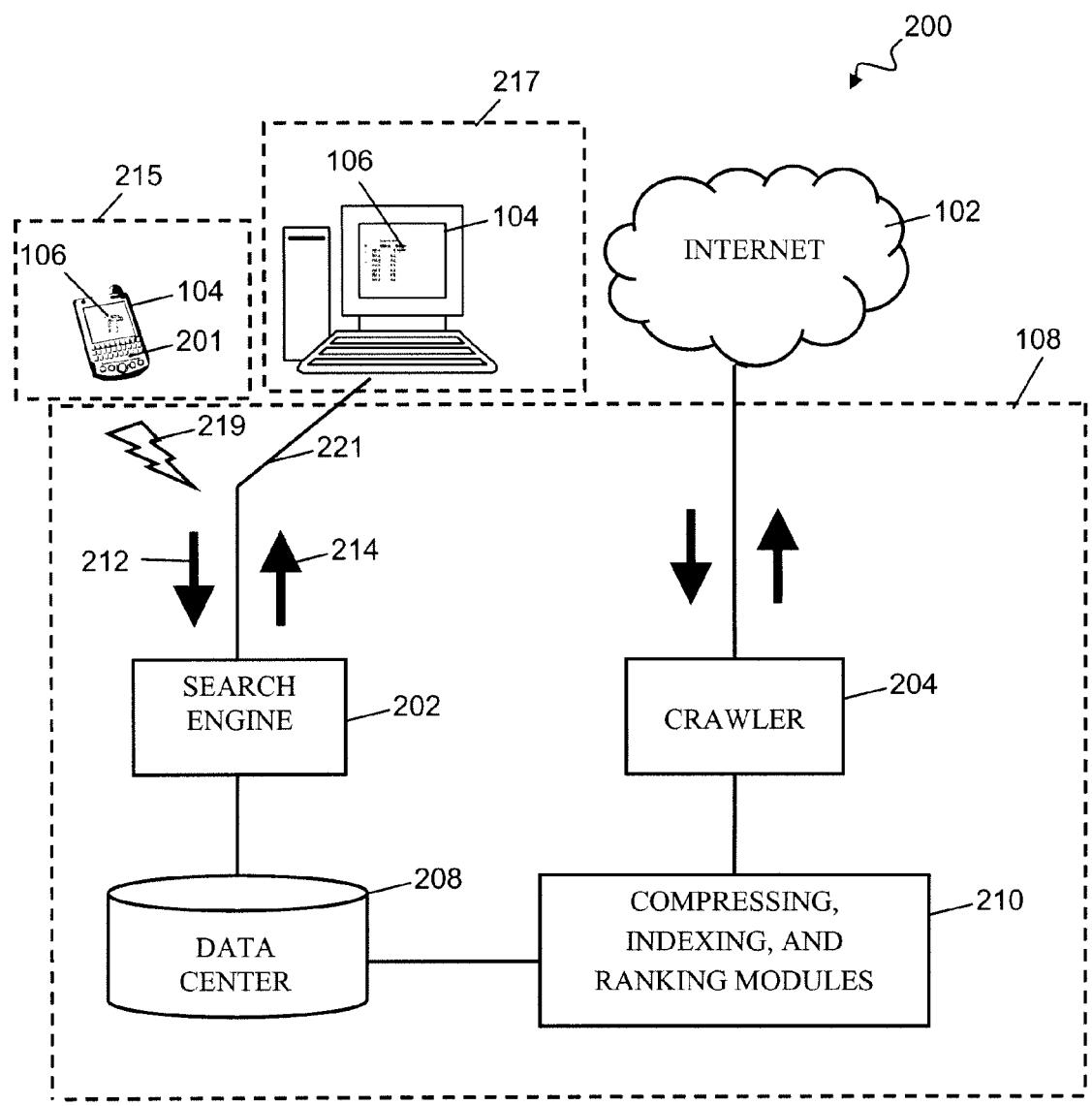
FIG. 2 is a schematic representation of an implementation of another system in which information from an electronic document collection is presented to a user in a structured presentation.

FIG. 2 is a schematic representation of an implementation of a system 200 in which information from an unstructured electronic document collection 102 is presented to a user in a structured presentation 106. In system 200, the data communication infrastructure 108 interconnects electronic document collection 102, display screen 104, and a collection of data storage and processing elements, including a search engine 202, a crawler 204, a data center 208, and document compressing, indexing and ranking modules 210.

Search engine 202 can be implemented on one or more computers deployed at one or more geographical locations that are programmed with one or more sets of machine-readable instructions for searching unstructured electronic document collection 102. Other functionality can be implemented on the one or more computers in addition to the functionality of search engine 202.

Crawler 204 can be implemented on one or more computers deployed at more or more geographical locations that are programmed with one or more sets of machine-readable instructions for crawling unstructured electronic document collection 102. Other functionality can be implemented on the one or more computers in addition to the functionality of crawler 204.

Compressing, indexing, and ranking modules 210 can be implemented on one or more computers deployed at more or more geographical locations that are programmed with one or more sets of machine-readable instructions for compressing, indexing, and ranking documents in collection 102. Other functionality can be implemented on the one or more computers in addition to the functionality of compressing, indexing, and ranking modules 210. The data center 208 stores information characterizing electronic documents in electronic document collection 102. The information characterizing such electronic documents can be stored in the form of an indexed database that includes indexed keywords and the locations of documents in collection 102 where the keywords can be found. The indexed database can be formed, e.g., by crawler 204.

In some implementations, the information stored in data center 208 can itself be organized to facilitate presentation of structured presentation 106 to a user. For example, information can be organized by crawler 204 and compressing, indexing and ranking modules 210 in anticipation of the need to present structured presentations 106 that are relevant to certain topics. The structure of information in data center 208 can facilitate the grouping, segmentation, and arrangement of information in structured presentations 106. This organization can be based on a variety of different factors. For example, an ontology can be used to organize information stored in data center 208. As another example, a historical record of previous structured presentations 106 can be used to organize information stored in data center 208. As another example, the data tables described in this specification can be used to organize information stored in data center 208.

As shown, system 200 includes multiple display screens 104 that can present structured presentations in accordance with machine-readable instructions. Display screens 104 can include, e.g., cathode ray tubes (CRT's), light emitting diode (LED) screens, liquid crystal displays (LCD's), gas-plasma displays, and the like. Display screens 104 can be an integral part of a self-contained data processing system, such as a personal data assistant (PDA) 215, a desktop computer 217, or a mobile telephone. In general, instructions for presenting structured presentations are modified to the particularities of a display screen 104 after receipt by such a self-contained data processing system. However, this is not always the case. For example, display screens 104 can also be part of more disperse systems where the processing of instructions for presenting a structured presentation is completed before the instructions are received at display screen 104. For example, display screens 104 can be incorporated into "dumb" devices, such as television sets or computer monitors, that receive instructions for presenting structured presentation 106 from a local or remote source.

In operation, system 200 can transform the unstructured information in collection 102 into structured presentation 106, which can be presented to a viewer. Such transformations can be performed in the context of web search in which a search engine receives and responds to information requests based on information extracted from the electronic documents in collection 102.

For example, personal digital assistant (PDA) 215 or desktop computer 217 can interact with a user and thereby receive a search query, e.g., by way of a web browser application. A description 212 of the query can be transmitted over a wireless data link 219 and/or a wired data link 221 to search engine 202. In response, search engine 202 can use query description 212 to identify information in data center 208 that can be used in presenting structured presentation 106 on display screen 104. The identified information can be drawn from two or more unspecified electronic documents in unstructured electronic document collection 102. In some instances, query description 212 can include search terms that are used by search engine 202 to retrieve information for presenting a structured presentation 106 to a user. For example, search terms in query description 212 can be used to identify, in data center 208, a collection of related instances, attributes that characterize such instances, value that characterize the individual instances, and/or other aspects of structured presentation 106.

The search engine 202 can also generate a response 214 to query description 212. The response 214 can be used to present structured presentation 106 for a user. In general, response 214 includes machine readable-instructions that can be interpreted by a data processing device in systems 215, 217 to present structured presentation 106. For example, response 214 can be coded in HTML to specify the characteristics and content of structured presentation 106. In other implementations, response 214 can include text snippets or other information from data center 208 that is used in presenting structured presentation 106. For example, response 214 can include a collection of values, the name of a new attribute, or an estimate of the likelihood that a value to be displayed in structured presentation 106 is correct, as discussed further below.

In many cases, system 200 uses the information stored in data center 208 to identify the location of one or more documents that are relevant to the query described in query description 212. For example, search engine 202 can compare the keywords in query description 212 to an index of keywords stored in data center 208. The comparison can be used to identify documents in collection 102 that are relevant to query description 212. The locations of such identified documents can be included in responses 214, e.g., as a hyperlink to the documents that are that are responsive to the described query.

In some implementations, the system 200 can store attributes and/or their respective values in a manner that facilitates the grouping, segmentation, and arrangement of information in structured presentations 106. For example, collections of instances, their attributes, and their values can be stored in data center 208 as structured presentations 106 are amended and changed by users interacting with client systems such as systems 215, 217. For example, instances, attributes, and values in one structured presentation 106 presented to a first viewer can be stored in the data center 208 and used in providing subsequent structured presentations 106 to other viewers.

Figure 3:
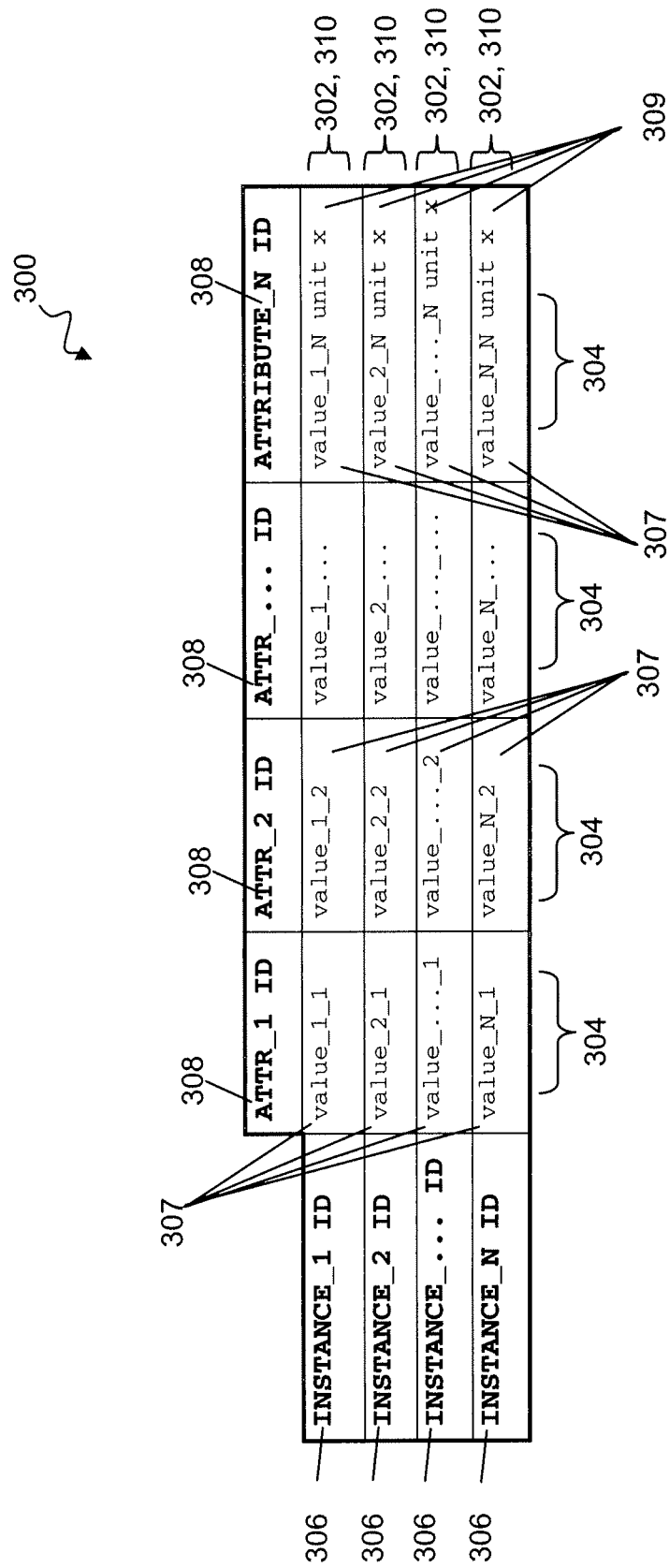
FIGS. 3, 4, and 5 are schematic representations of example structured presentations.

FIG. 3 is a schematic representation of an example structured presentation 106, namely, one that includes a table 300. Table 300 is an organized, systematic arrangement of one or more identifiers of instances, as well as the values of particular attributes of those instances. Instances are individually identifiable entities and generally share at least some common attributes. An attribute is a property, feature, or characteristic of an entity. For example, Tom, Dick, and Harry are instances of individuals. Each such individual has attributes such as a name, a height, a weight, and the like. As another example, city instances each have a geographic location, a mayor, and a population. As yet another example, a product instance can have a model name, a maker, and a year.

The attributes of an instance can be characterized by values. The values of a particular attribute of a particular instance thus characterize that particular instance. For example, the name of an individual can have the value "Tom," the population of a city can have the value "4 million," and the model name of a product can have the value "Wrangler." In some implementations, structured presentations such as table 300 can also include identifiers of attributes, as well as identifiers of the units in which values are expressed.

The grouping, segmentation, and arrangement of information in table 300 can be selected to facilitate understanding of the information by a user. In this regard, table 300 includes a collection of rows 302. Each row 302 includes an instance identifier 306 and a collection of associated attribute values 307. The arrangement and positioning of attribute values 307 and instance identifiers 306 in rows 302 thus graphically represents the associations between them. For example, a user can discern the association between attribute values 307 and the instance identifier 306 that is found in the same row 302.

Table 300 also includes a collection of columns 304. Each column 304 includes an attribute identifier 308 and a collection of associated attribute values 307. The arrangement and positioning of attribute values 307 and attribute identifier 308 in columns 304 thus graphically represent the associations between them. For example, a user can discern the association between attribute values 307 and the attribute identifier 308 that is found in the same column 304 based on their alignment.

Each row 302 is a structured record 310 in that each row 302 associates a single instance identifier 306 with a collection of associated attribute values 307. Further, the arrangement and positioning used to denote these associations in one structured record 310 is reproduced in other structured records 310 (i.e., in other rows 302). Indeed, in many cases, all of the structured records 310 in a structured presentation 106 are restricted to having the same arrangement and positioning of information. For example, values 307 of the attribute "ATTR_2" are restricted to appearing in the same column 304 in all rows 302. As another example, attribute identifiers 308 all bear the same spatial relationship to the values 307 appearing in the same column 304. Moreover, changes to the arrangement and positioning of information in one structured record 310 are generally propagated to other structured record 310 in the structured presentation 106. For example, if a new attribute value 307 that characterizes a new attribute (e.g., "ATTR_2¾") is added to one structured record 310, then a new column 304 is added to structured presentation 106 so that the values of attribute "ATTR_2¾" of all instances can be added to structured presentation 106.

In some implementations, values 307 in table 300 can be presented in certain units of measure. Examples of units of measure include feet, yards, inches, miles, seconds, gallons, liters, degrees Celsius, and the like. In some instances, the units of measure in which values 307 are presented are indicated by unit identifiers 309. Unit identifiers 309 can appear, e.g., beside values 307 and/or beside relevant attribute identifiers 308. The association between unit identifiers 309 and the values 307 whose units of measure are indicated is indicated to a viewer by such positioning. In many cases, all of the values 307 associated with a single attribute (e.g., all of the values 307 in a single column 304) are restricted to being presented in the same unit of measure.

The information extracted from electronic document collection 102 by systems 100, 200 can impact the presentation of table 300 to a user in a variety of different ways. For example, the information extracted from electronic document collection 102 can be used to determine values 307 for populating table 300. As another example, the information extracted from electronic document collection 102 can be used to suggest new attributes and/or new instances for addition to table 300.

In some implementations, instance identifiers 306 can be selected based on one or more search strings. For example, if the search string "hybrid vehicles" is received from a user by search engine 202, systems such as system 200 can generate and populate table 300 based on information extracted from electronic document collection 102 using the search string. For example, system 200 can access data center 208, identify instance identifiers 306 in the electronic documents that are relevant to the search string, determine a set of common attributes for the identified instances—as well as identifiers 308 of those attributes and values 307 for those attributes. In effect, system 200 can determine instance identifiers 306, attribute identifiers 308, as well as the associated values 307 based on the received search string.

In some implementations, one or more attribute identifiers 308, instance identifiers 306, and/or values 307 can be received from a user for whom table 300 is to be displayed. As discussed further below, systems such as system 200 can generate and populate table 300 based on information extracted from electronic document collection 102 using one or more received attribute identifiers 308, instance identifiers 306, and/or values 307. In effect, system 200 can formulate new instance identifiers 306, attribute identifiers 308, as well as the associated values 307 based on the received attribute identifiers 308, instance identifiers 306, and/or values 307.

Figure 4:
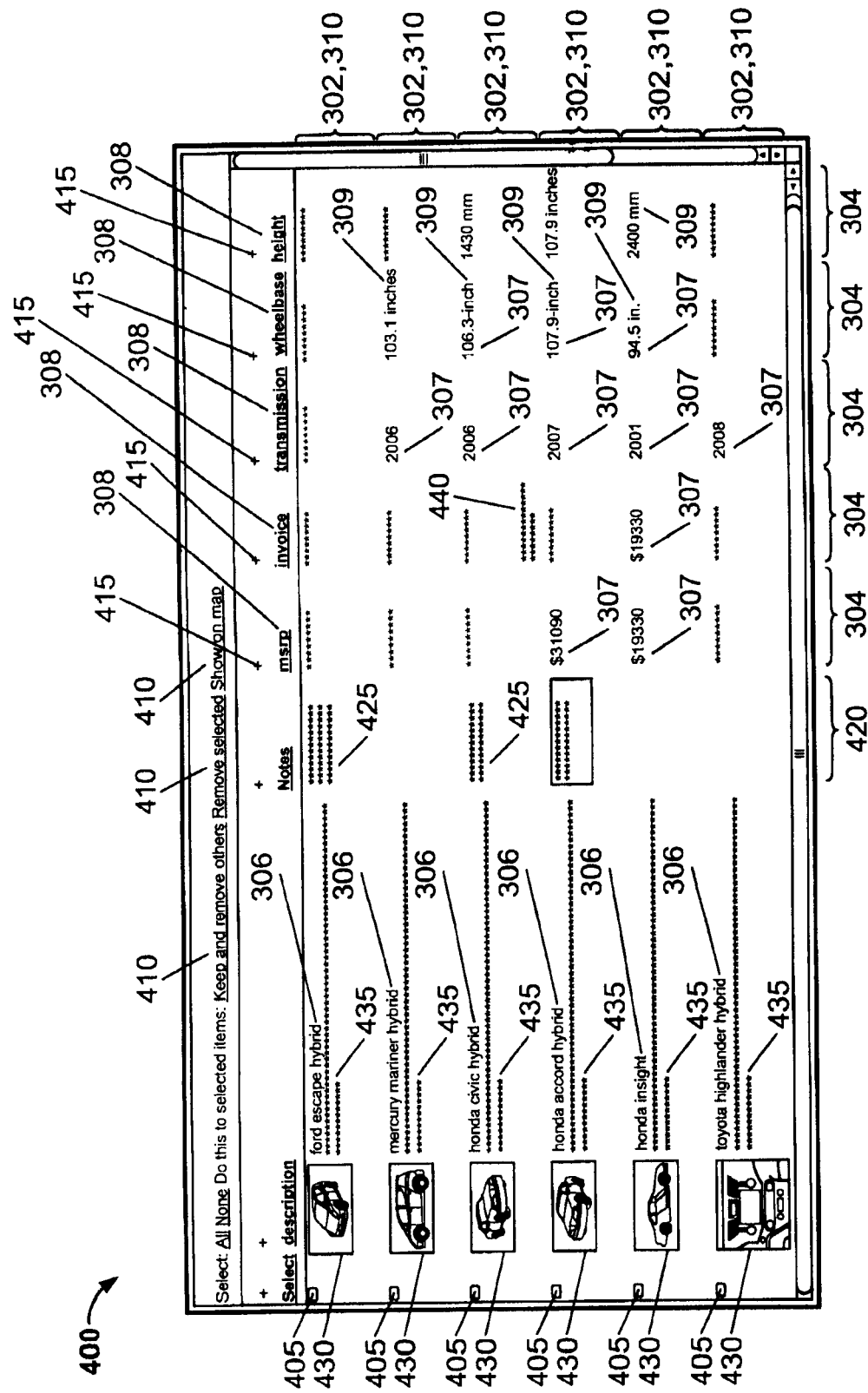

FIG. 4 is a schematic representation of another implementation of a structured presentation, namely, one that includes a table 400. In addition to including attribute identifiers 308, instance identifiers 306, values 307, unit identifiers 309 organized into rows 302 and columns 304, table 400 also includes a number of interactive elements for interacting with a user. In particular, table 400 includes a collection of instance selection widgets 405, a collection of action triggers 410, a collection of column action trigger widgets 415, and a notes column 420.

Instance selection widgets 405 are user interface components that allow a user to select structured records 310 in table 400. For example, instance selection widgets 405 can be a collection of one or more clickable checkboxes that are associated with a particular structured record 310 by virtue of arrangement and positioning relative to that structured record 310. Instance selection widgets 405 are "clickable" in that a user can interact with widgets 405 using a mouse (e.g., hovering over the component and clicking a particular mouse button), a stylus (e.g., pressing a user interface component displayed on a touch screen with the stylus), a keyboard, or other input device to invoke the functionality provided by that component.

Action triggers 410 are user interface components that allow a user to trigger the performance of an action on one or more structured records 310 in table 400 selected using instance selection widgets 405. For example, action triggers 410 can be clickable text phrases, each of which can be used by a user to trigger an action described in the phrase. For example, a "keep and remove others" action trigger 410 triggers the removal of structured records 310 that are not selected using instance selection widgets 405 from the display of table 400. As another example, a "remove selected" action trigger 410 triggers the removal of structured records 310 that are selected using instance selection widgets 405 from the display of table 400. As yet another example, a "show on map" action trigger 410 triggers display of the position of structured records 310 that are selected using instance selection widgets 405 on a geographic map. For example, if a selected instance is a car, locations of car dealerships that sell the selected car can be displayed on a map. As another example, if the selected instances are vacation destinations, these destinations can be displayed on a map.

Column action trigger widgets 415 are user interface components that allow a user to apply an action to all of the cells within a single column 304. When a user interacts with the clickable '+' sign, a further user interface component is displayed which offers to the user a set of possible actions to be performed. The actions in this set can include, e.g., removing the entire column 304 from the structured presentation 400 or searching to find values for all the cells in column 304 which are currently blank.

Notes column 420 is a user interface component that allows a user to associate information with an instance identifier 306. In particular, notes column 420 includes one or more notes 425 that are each associated with a structured record 310 by virtue of arrangement and positioning relative to that structured record 310. The information content of notes 425 is unrestricted in that, unlike columns 304, notes 425 are not required to be values of any particular attribute. Instead, the information in notes 425 can characterize unrelated aspects of the instance identified in structured record 310.

In some implementations, table 400 can include additional information other than values of any particular attribute. For example, table 400 can include a collection of images 430 that are associated with the instance identified in a structured record 310 by virtue of arrangement and positioning relative to that structured record 310. As another example, table 400 can include a collection of text snippets 435 extracted from electronic documents in collection 102. The sources of the snippets can be highly ranked results in searches conducted using instance identifiers 306 as a search string. Text snippets 435 are associated with the instance identified in a structured record 310 by virtue of arrangement and positioning relative to that structured record 310.

As another example, table 400 can include one or more hypertext links 440 to individual electronic documents in collection 102. For example, the linked documents can be highly ranked results in searches conducted using instance identifiers 306 as a search string. As another example, the linked documents can be source of a value 307 that was extracted to populate table 400. In some instances, interaction with hypertext link 440 can trigger navigation to the source electronic document based on information embedded in hypertext link 440 (e.g., a web site address).

Figure 5:
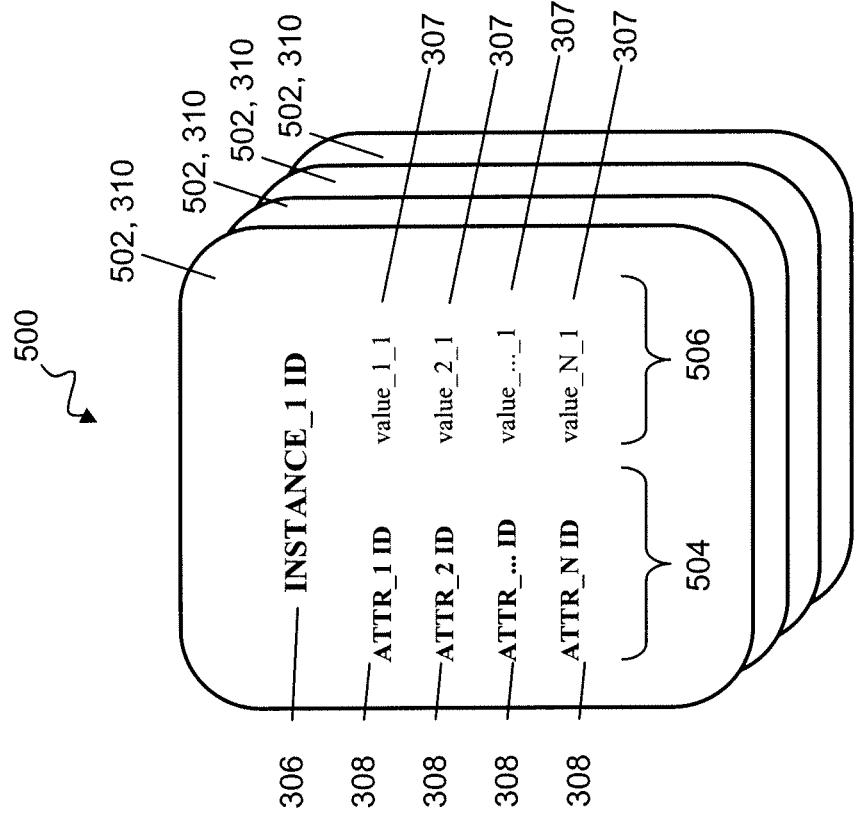

FIG. 5 is a schematic representation of another implementation of a structured presentation, namely, a collection of cards 500. Card collection 500 is an organized, systematic arrangement of one or more identifiers of instances, as well as the values of particular attributes of those instances. The attributes of an instance can be specified by values. Moreover, card collection 500 generally includes identifiers of attributes, as well as identifiers of the units in which values are expressed, where appropriate.

The grouping, segmentation, and arrangement of information in card collection 500 can be selected to facilitate an understanding of the information by a user. In this regard, card collection 500 includes a collection of cards 502. Each card 502 includes an instance identifier 306 and a collection of associated attribute values 307. The arrangement and positioning of attribute values 307 and instance identifiers 306 in cards 502 thus graphically represents the associations between them. For example, a user can discern the association between attribute values 307 and the instance identifier 306 that is found on the same card 502.

In the illustrated implementation, cards 502 in card collection 500 also include a collection of attribute identifiers 308. Attribute identifiers 308 are organized in a column 504 and attribute values 307 are organized in a column 506. Columns 504, 506 are positioned adjacent one another and aligned so that individual attribute identifiers 308 are positioned next to the attribute value 307 that characterizes that identified attribute. This positioning and arrangement allows a viewer to discern the association between attribute identifiers 308 and the attribute values 307 that characterize those attributes.

Each card 502 is a structured record 310 in that each card 502 associates a single instance identifier 306 with a collection of associated attribute values 307. Further, the arrangement and positioning used to denote these associations in one card 502 is reproduced in other cards 502. Indeed, in many cases, all of the cards 502 are restricted to having the same arrangement and positioning of information. For example, the value 307 that characterizes the attribute "ATTR_1" is restricted to bearing the same spatial relationship to instance identifiers 306 in all cards 502. As another example, the order and positioning of attribute identifiers 308 in all of the cards 502 is the same.

Moreover, changes to the arrangement and positioning of information in one card 502 are generally propagated to other cards 502 in card collection 500. For example, if a new attribute value 307 that characterizes a new attribute (e.g., "ATTR_1¾") is inserted between the attribute values "value_1_1" and "value_2_1" in one card 502, then the positioning of the corresponding attribute values 307 in other cards 502 is likewise changed.

In some implementations, cards 502 in card collection 500 can include other features. For example, cards 502 can include interactive elements for interacting with a user, such as instance selection widgets, action triggers, attribute selection widgets, a notes entry, and the like. As another example, cards 502 in card collection 500 can include additional information other than values of any particular attribute, such as images and/or text snippets that are associated with an identified instance. As another example, cards 502 in card collection 500 can include one or more hypertext links to individual electronic documents in collection 102. Such features can be associated with particular instances by virtue of appearing on a card 502 that includes an instance identifier 306 that identifies that instance.

During operation, a viewer can interact with the system presenting card collection 500 to change the display of one or more cards 502. For example, a viewer can trigger the side-by-side display of two or more of the cards 502 so that a comparison of the particular instances identified on those cards is facilitated. As another example, a viewer can trigger a reordering of card 502, an end to the display of a particular card 502, or the like. As another example, a viewer can trigger the selection, change, addition, and/or deletion of attributes and/or instances displayed in cards 502. As yet another example, a viewer can trigger a sorting of cards into multiple piles according to, e.g., the values of an attribute values 307 in the cards.

In some implementations, cards 502 will be displayed with two "sides." For example, a first side can include a graphic representation of the instance identified by instance identifier 306, while a second side can include instance identifier 306 and values 307. This can be useful, for example, if the user is searching for a particular card in the collection of cards 500, allowing the user to identify the particular card with a cursory review of the graphical representations on the first side of the cards 502.

Figure 6:
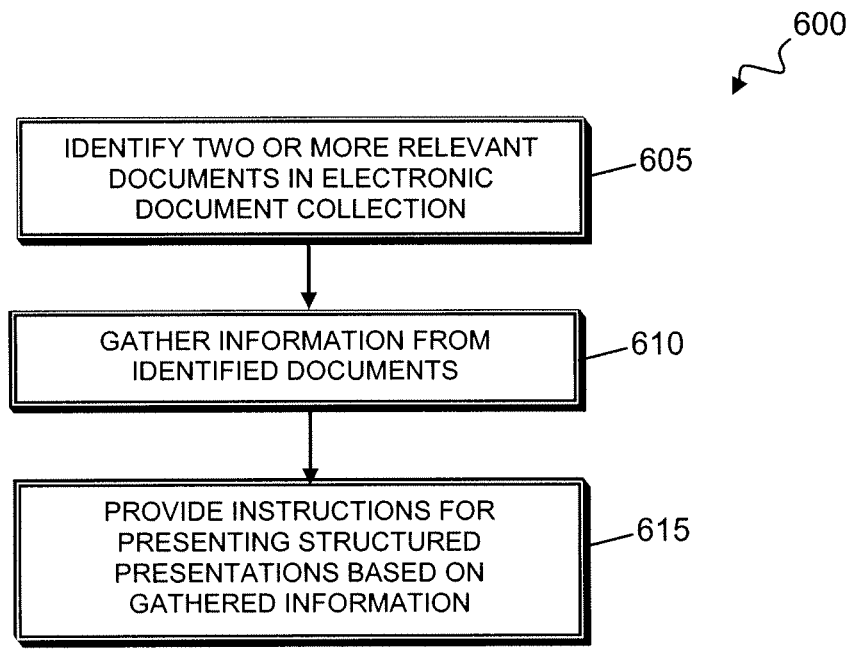
FIG. 6 is a flow chart of an example process for presenting information from an electronic document collection to a user in a structured presentation.

FIG. 6 is a flow chart of a process 600 for presenting information from an electronic document collection to a user in a structured presentation. Process 600 can be performed by one or more computers that perform operations by executing one or more sets of machine-readable instructions. For example, process 600 can be performed by the search engine 202 in system 200. In some implementations, process 600 can be performed in response to the receipt of a trigger, such as a user request to create or change a structured presentation.

The system performing process 600 can identify two or more responsive electronic documents in the electronic document collection (step 605). The responsive documents can be identified in a number of different ways. In some instances, documents are identified based on "new" information—such as, e.g., a new search query—received from viewer. For example, the system can compare a newly received search query with the content of the electronic documents in the electronic document collection using string comparisons. As another example, the system can access a data center such as data center 208 and compare the terms in a search query with an index of keywords to identify the location of responsive electronic documents.

In some instances, documents are identified based on "old" information that is already found in a structured presentation. Among the information found in a structured presentation are the identities of instances, attributes, values, and the units in which the values are represented. The system performing process 600 can use this old information to identify responsive electronic documents in the electronic document collection. For example, documents that include instances already found in a structured presentation can be identified as responsive. As another example, documents that characterize instances using attributes already found in a structured presentation can be identified as responsive. Additional examples of such identifications are discussed further below.

The system performing process 600 can also gather information from the identified electronic documents (step 610). The gathered information can regard one or more instances, attributes, and/or values. The system performing process 600 can gather this information directly from the documents in an electronic document collection or from previously assembled collections of information that characterize the electronic documents in an electronic document collection. For example, in the context of system 200 (FIG. 2), the system performing process 600 can locate documents in collection 102, access the located documents, and extract the information directly from the original documents in collection 102. As another example in the context of system 200 (FIG. 2), the system performing process 600 can access a collection of information in data center 208 and gather the information from, e.g., a database that includes an index of keywords and the location of documents that include those keywords, an ontology, and/or a historical record of previous structured presentations that were presented using information extracted from documents in collection 102.

The system performing process 600 can use the gathered information to provide instructions for presenting structured presentations based on the gathered information (step 615). For example, the system performing process 600 can generate machine-readable instructions for presenting a structured presentation such as tables 300, 400 or collection of cards 500.

Figure 7:
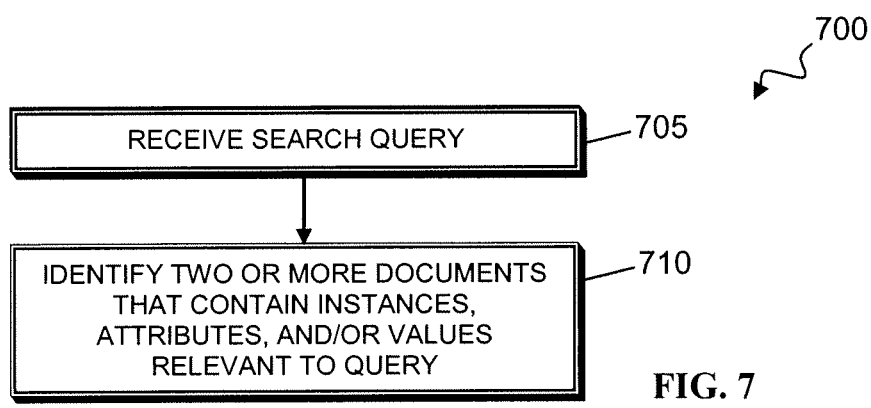
FIGS. 7 and 8 are flow charts of example processes for identifying two or more relevant documents in an electronic document collection.

FIG. 7 is a flow chart of a process 700 for identifying responsive documents in an electronic document collection. Process 700 can be performed in isolation or in conjunction with other data processing activities. For example, process 700 can be performed in conjunction with identifying two or more responsive electronic documents in the electronic document collection (step 605) in process 600 (FIG. 6).

The system performing process 700 receives a search query (step 705). For example, the system can receive one or more search strings (e.g., "hybrid vehicles") from a user. As another example, the system can receive a search string from another process or system. In some implementations, the search string is received through an application programming interface (API), a common gateway interface (CGI) script, or other programming interfaces. In other implementations, the search string is received through a web portal, a web page, or web site, or the like.

In response, the system performing process 700 identifies two or more documents that contain instances, attributes, and/or values that are responsive to the search query (step 710). The documents can be identified by classifying the role that terms in the search query are to play in a structured presentation. For example, the terms in a search query can be classified as a categorization of the instances that are to appear in a structured presentation based on, e.g., the particular terms in the search query, an express indication by the user as to how search query terms are to be classified, and/or the context of the search. By way of example, the terms in a search query "cities in California" can be classified as a categorization of instances such as "San Diego," "Los Angeles," and "Bakersfield" due to the plural term "cities" being characterized by an attribute, namely, being "in California." As another example, the terms in a search query "Ivy League schools" can be classified as categorization of instances (such as "Cornell," "Columbia," and "Brown") due to the plural term "schools" being characterized by an attribute "Ivy League."

In some cases, additional information must be used to classify the terms in a search query. For example, the search query "Ivy League" can reasonably be taken as a categorization of school instances or as an example instance of the category "athletic conferences" which includes instances such as "Atlantic Coast Conference" and "PAC-10." In such cases, the terms can be classified, e.g., based on an express indication by the user as to how they are to be classified or based on the context of the terms in a search session. For example, if a user had previously entered the phrases "Atlantic Coast Conference" and "PAC-10" as search queries, the search query "Ivy League" can be taken as an example instance that is to appear in a structured presentation alongside those other instances.

The documents can be identified either directly in electronic document collection 102 or indirectly based on information in electronic data center 208. Such identifying information can include, e.g., the URL where the document was found the last time it was crawled.

Figure 8:
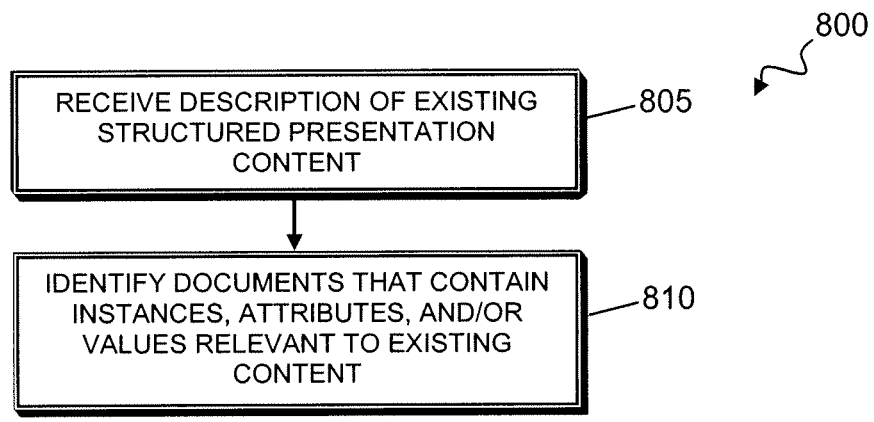

FIG. 8 is a flow chart of another example process 800 for identifying two or more responsive documents in an electronic document collection. Process 800 can be performed in isolation or in conjunction with other data processing activities. For example, process 800 can be performed in conjunction with identifying two or more responsive electronic documents in the electronic document collection (step 605) in process 600 (FIG. 6). As another example, process 800 can be performed in conjunction with process 700 for identifying responsive documents in an electronic document collection at step 605 in process 600 (FIG. 6). For example, processes 700, 800 can be part of an iterative, interactive process in which a search query is received and used to identify a first collection of responsive documents, a first structured presentation that includes content drawn from the identified documents is presented to a user, user modifications are received, and a description of the modified structured presentation is used to identify a second collection of relevant documents. In some implementations, process 800 can be performed several times. In some implementations, process 800 can be performed without user input, e.g., by crawler 206 in system 200 (FIG. 2).

The system performing process 800 receives a description of existing content of a structured presentation (step 805). In particular, the system can receive a description of the instances, the attributes, the values, and/or the units in which values are presented in an existing structured presentation. The description can include, e.g., identifiers of the instances and the attributes and/or ranges of the values of the attributes. The description can also include a categorization of the instances and/or attributes. Such a categorization can be determined, e.g., using an ontology or based on a categorization assigned by a viewer to a structured presentation. For example, if a user entitles a structured presentation "Ivy League Schools," then this title can be taken as a categorization of the instances in that structured presentation.

In response, the system performing process 800 can identify one or more documents that contain instances, attributes, and/or values that are relevant to the existing content (step 810). For example, the system can compare the identifiers of instances and/or attributes to indexed keywords to determine if particular documents contain one or more of the instances and/or attributes that already appear in the existing content of a structured presentation. As another example, the system can identify new instances, their attributes, and the values of such attributes from such documents, compare these values to values that already appear in the existing content of a structured presentation, and determine whether the new instances are potentially relevant to the to the existing content of the structured presentation.

The documents can be identified either directly in electronic document collection 102 or using identifying information in electronic data center 208. Such identifying information can include, e.g., the memory location where the document was found the last time it was crawled.

Figure 9:
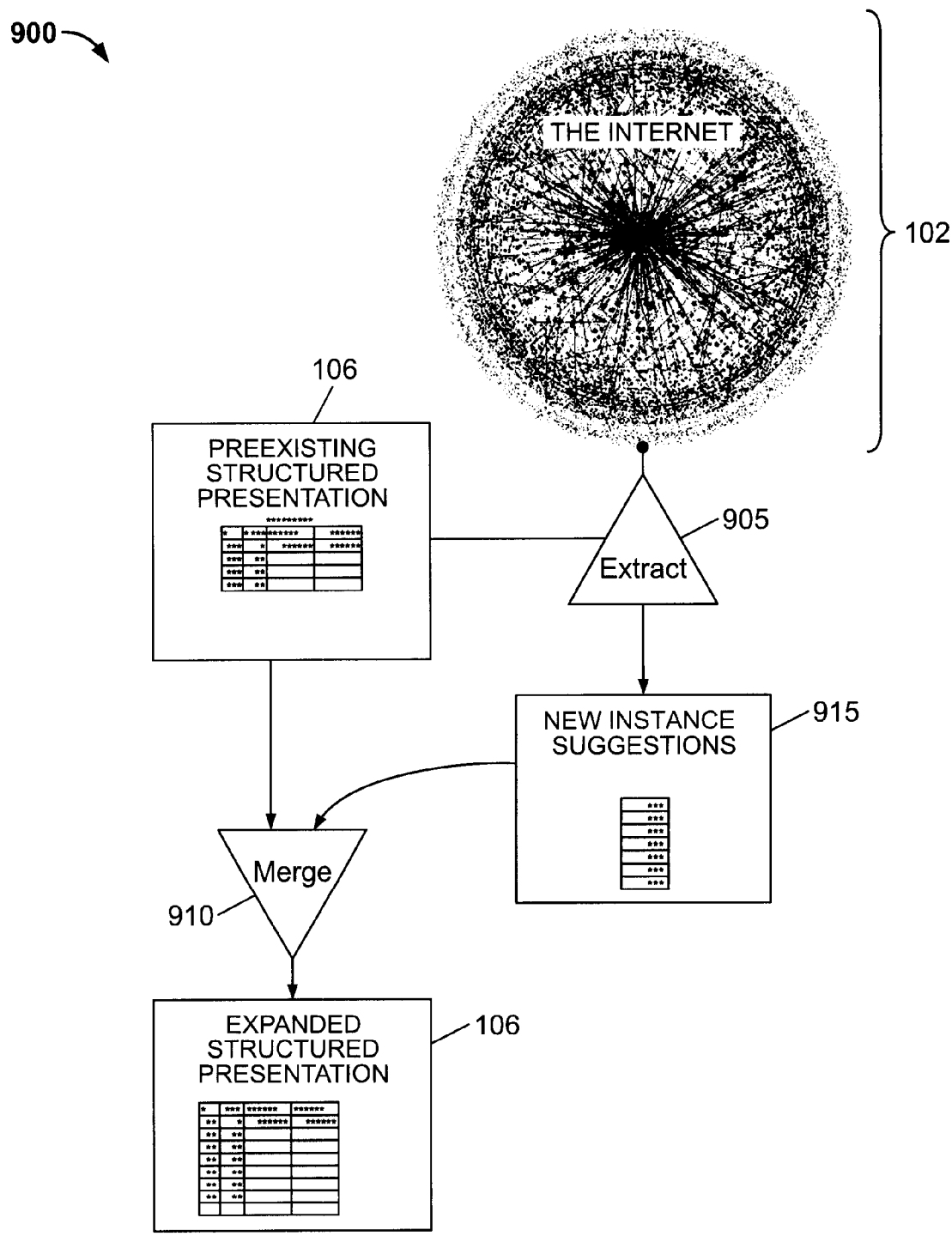
FIG. 9 is a schematic representation of a process by which new instances can be added to expand a preexisting structured presentation.

FIG. 9 is a schematic representation of a process 900 by which new instances can be added to expand a preexisting structured presentation. Process 900 can be performed by a system of one or more computer that perform operations by one or more sets of machine-readable instructions, such as a system 200 (FIG. 2).

Process 900 includes an extraction operation 905 and a merge operation 910 that add new instances to a preexisting structured presentation based on information drawn from documents in electronic document collection 102. In particular, process 900 suggests one or more new instances based on information presented in the preexisting structured presentation 106. For example, if the structured presentation includes a number of instances corresponding to certain movies, the system 200 can suggest additional instances of movies according to information drawn from the electronic document collection. That is, the system 200 can identify and suggest additional instances according to similarities of the attribute identifiers, units of measurement of the attribute values, values of the attribute values, or combinations thereof. For example, the system 200 may suggest movies that have similar show times, theaters, or run times.

As shown in FIG. 9, extraction operation 905 uses the characteristics of a preexisting structured presentation 106 to extract a collection of new instance suggestions from electronic document collection 102. Example characteristics include the instances in the preexisting structured presentation, the attributes in the preexisting structured presentation, and the values of the attributes in the preexisting structured presentation. The characteristics of the preexisting structured presentation 106 can be expressed as a collection of machine-readable information and can be received by a system of one or more computer that perform operations by one or more sets of machine-readable instructions. For example, the characteristics of the preexisting structured presentation 106 can be received by a search engine 202 (FIG. 2).

During extraction operation 905, one or more new instance suggestions can be formulated based on the content of documents in electronic document collection 102 and the characteristics of preexisting structured presentation 106. A variety of different techniques for formulating new instance suggestions can be used, as discussed further below.

Some or all of the new instance suggestions can be merged with the preexisting structured presentation 102 in merge operation 910 to form an expanded structured presentation 106. The expanded structured presentation can be displayed for a viewer, e.g., at a display such as display screen 106.

All the new instance suggestions formulated during extraction operation 905 need not be merged with the preexisting structured presentation 102 and displayed for a viewer. For example, in some implementations, a collection of new instance suggestions can be presented to a viewer along with an interactive element that allows the viewer to select one or more instances that are to be added. However, in other implementations, the new instance suggestions can be added automatically, without user interaction, and without winnowing of the new instance suggestions before display. More details regarding the merger can be found, e.g., in the disclosure entitled "RETRIEVING AND DISPLAYING INFORMATION FROM AN UNSTRUCTURED ELECTRONIC DOCUMENT COLLECTION," Ser. No. 12/355,607.

Figure 10:
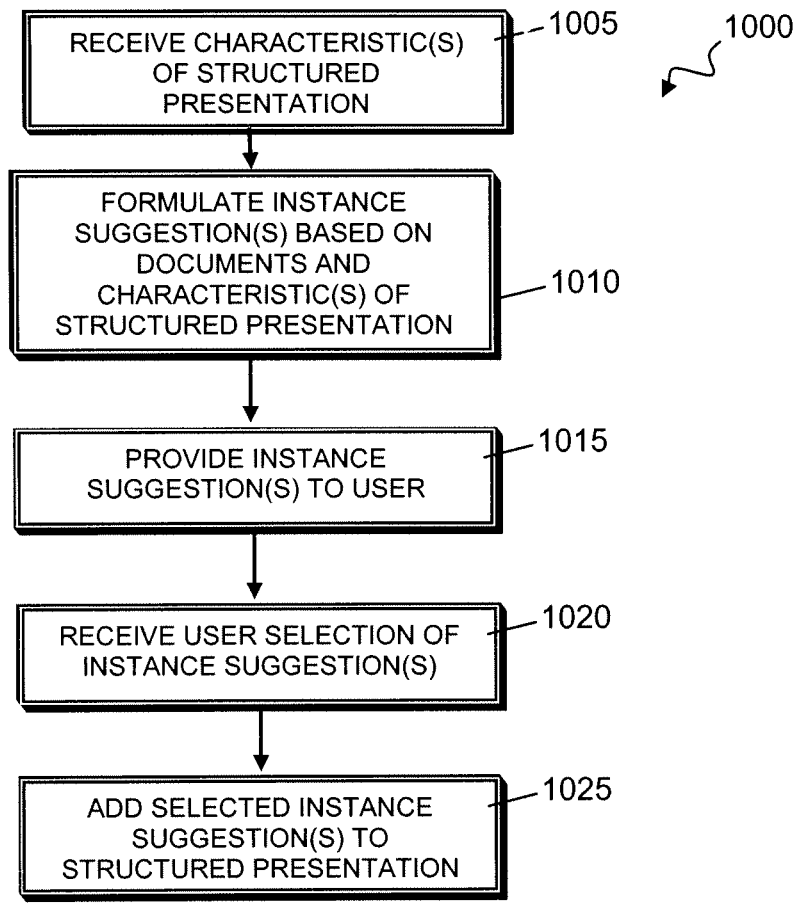
FIG. 10 is a flow chart of an example process for adding instances to a structured presentation based on the content of documents in an electronic document collection.

FIG. 10 is a flow chart of an example process 1000 for adding instances to a structured presentation based on the content of documents in an electronic document collection. Process 1000 can be performed by a system of one or more computer that perform operations by one or more sets of machine-readable instructions. For example, process 1000 can be performed by the search engine 202 in system 200.

In some implementations, process 1000 can be performed in response to receiving input, e.g., from a user or from another system or process that triggers an update of the structured presentation 106. For example, process 1000 can be performed in response to a user request that one or more new instances be added to a structured presentation 106. As another example, process 1000 may be performed by a search engine, such as search engine 202 (FIG. 2), in response to receipt of a search query.

The system performing process 1000 can receive one or more characteristics of a preexisting structure display (step 1005). For example, the system can receive one or more attribute identifiers of the preexisting structured presentation. As another example, the system can receive one or more instance identifiers that appear in the preexisting structured presentation.

The system performing process 1000 can formulate one or more instance suggestions from documents in an electronic document collection based on one or more characteristics of the preexisting structured presentation (step 1010). Instance suggestions can be formulated based on these characteristics in a number of different ways. For example, in one implementation, the system can formulate instance suggestions from documents in an electronic document collection 102 by constructing search queries using attribute identifiers drawn from the preexisting structured presentation. These search queries can be used to identify instances that may share similar attributes using string comparisons or other matching techniques. Examples of other approaches are discussed further below.

The system performing process 1000 can provide one or more instance suggestions to a user (step 1015). For example, a list of instance suggestions can be displayed for the user on the same display screen that displays the preexisting structured presentation.

The system performing process 1000 can receive user selection of one or more instance suggestions (step 1020). For example, a user interface component can interact with a user to receive one or more user inputs (e.g., mouse clicks, key strokes, or other user input) that select one or more instance suggestions.

The system performing process 1000 can add the selected instance suggestions to a structured presentation as new structured records (step 1025). For example, when the structured presentation is a table such as table 300 (FIG. 3), the system can add new rows 302. As another example, when the structured presentation is a collection of cards such as collection of cards 500 (FIG. 5), the system can add new cards 500.

Figure 11:
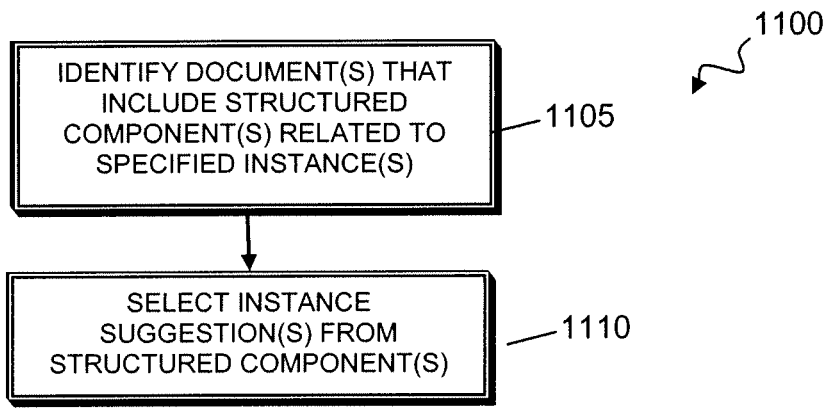
FIG. 11 is a flow chart of an example process for formulating instance suggestions from electronic documents in an electronic document collection based on characteristics of a preexisting structured presentation.

FIG. 11 is a flow chart of an example process 1100 for formulating instance suggestions from electronic documents in an electronic document collection based on characteristics of a preexisting structured presentation. Process 1100 can be performed alone or in conjunction with other activities. For example, process 1100 can be performed at step 1010 in process 1000 (FIG. 10).

Process 1100 can be performed by a system of one or more computer that perform operations by one or more sets of machine-readable instructions. For example, process 1100 can be performed by search engine 202 in system 200 (FIG. 2).

The system performing process 1100 can identify one or more documents that include structured components related to instances that are specified in a preexisting structured presentation (step 1105). Structured components are portions or regions of an electronic document that are structured. Example structured components include tables, lists, records, collections of attribute-value pairs, and the like. Structured components can thus organize attribute values and instance identifiers in conformity with a defined structure, much like a structured presentation.

The entirety of an electronic document that includes a structured component need not be structured. For example, an electronic document can include a table between two paragraphs of unstructured text. Moreover, structured components in different documents need not have the same format or conform with a predetermined or persistent structure. Indeed, the organization of information in one structured component generally can be changed without regard to the organization of information in structured components that appear in other documents. By way of example, if a structured list of schools in one person's resume is changed to delete the year of graduation, there is no need to insure that other structured lists of schools in other resumes are similarly changed.

The system performing process 1100 can identify documents that include structured components in a variety of ways. For example, tables and other structured components can be identified using metadata labels, such as HTML tags, found in the documents themselves. As another example, structured components can be identified by identifying repetitive elements (such as a series of comma or tab delineations) in a document.

Structured components relate to instances specified in a preexisting structured presentation when they include information that is relevant to the specified instances. For example, a structured component that characterizes one or more of the specified instances with one or more attribute values can be considered relevant to the instances specified in a preexisting structured presentation. As another example, a structured component that characterizes one or more of the same attributes of instances that differ from instances specified in a preexisting structured presentation can be considered relevant to the specified instances. In many implementations, the instance and/or attribute identifiers need not be the same. Rather, conceptually related instances and attributes can be used to identify documents that include structured components.

Thus, in some implementations, the system performing process 1100 can identify one or more documents that include structured components related to instances that are specified in a preexisting structured presentation by identifying documents that include the same or related instance identifiers as found in the preexisting structured presentation and/or the same or related attribute identifiers as found in the preexisting structured presentation.

The system performing process 1100 can select one or more instance suggestions from the structured components (step 1110). This selection process can winnow down the number of instances that are to be suggested to a user. The selection of instance suggestions can be performed in a number of ways. For example, the system can select instance suggestions based on a category of the instances in the structured components, the attributes of the instances in the structured components, and/or the values of the attributes of the instances in the structured components, as discussed further below.

Figure 12:
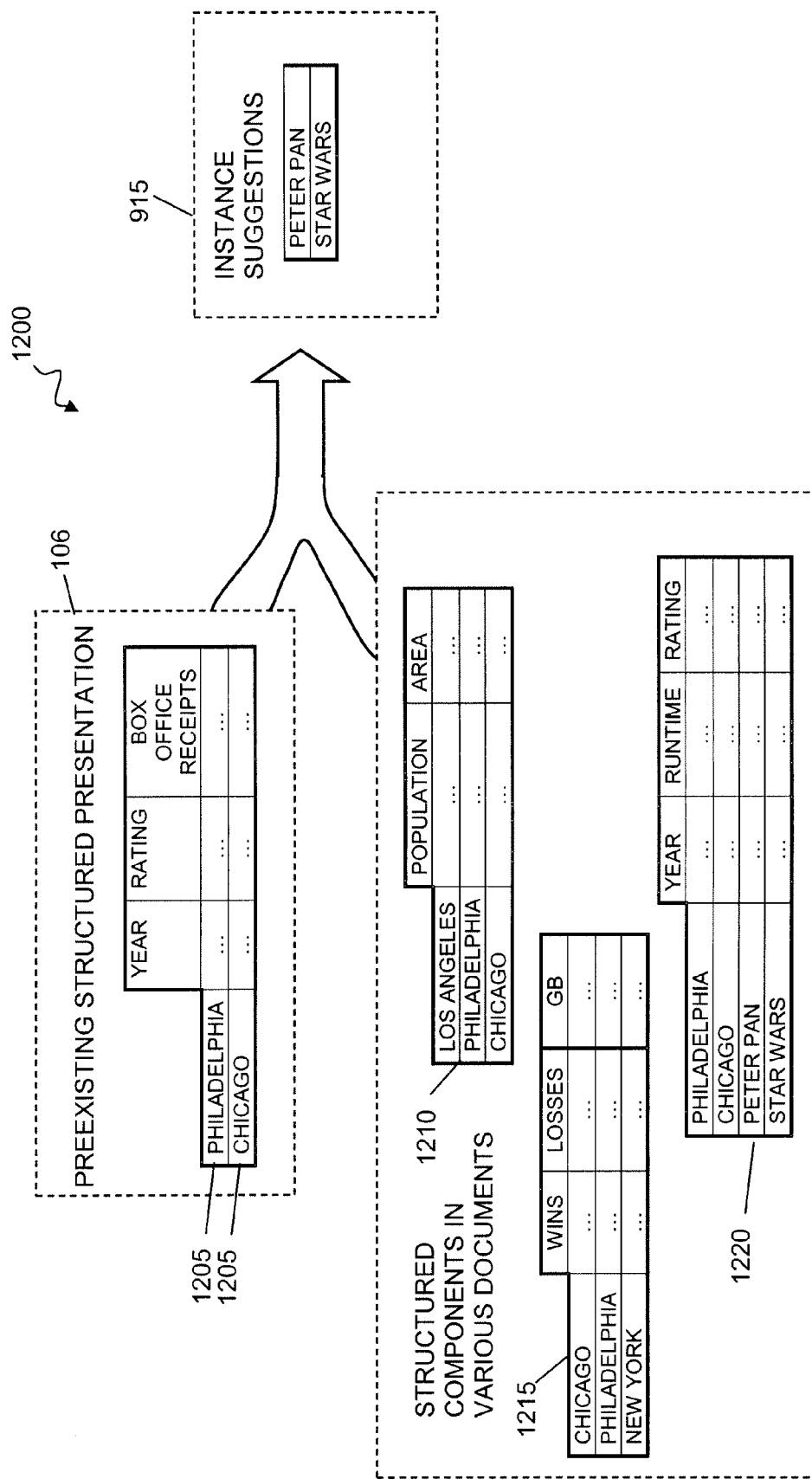
FIG. 12 is a representation of a formulation of instance suggestions from electronic documents in an electronic document collection based on characteristics of a preexisting structured presentation.

FIG. 12 is a representation 1200 of a formulation of instance suggestions from electronic documents in an electronic document collection based on characteristics of a preexisting structured presentation. In particular, representation 1200 illustrates a formulation of instance suggestions using one implementation of process 1100 (FIG. 11).

As shown, a preexisting structured presentation specifies a collection of instances 1205 (i.e., the instances "Philadelphia" and "Chicago.") Furthermore, different documents in an electronic document collection (e.g., collection 102) include different structured components 1210, 1215, 1220. Structured components 1210, 1215, 1220 can be identified as relevant to specified instances 1205 based on, e.g., the same instance identifiers "Philadelphia" and "Chicago" appearing therein.

As shown, structured components 1210, 1215, 1220 include a wide variety of different potential instance suggestions based on different contexts. In particular, in the context of structured component 1210, the instances "Philadelphia" and "Chicago" are part of a tabular component that represents the properties of various cities. In the context of structured component 1215, the instances "Philadelphia" and "Chicago" are part of a structured component that represents part of the standings in the National League East sometimes in the 1970's. In the context of structured component 1220, the instances "Philadelphia" and "Chicago" are part of a tabular component that represents the properties of various films.

Rather than suggesting all the various instances found in structured components 1210, 1215, 1220 to a user, instance selections can be selected from components 1210, 1215, 1220 based on the attributes used to characterize those instances. In particular, as shown, preexisting structured presentation 106 characterizes the instances "Philadelphia" and "Chicago" using values of the attributes "year," "rating," and "box office receipts." Structured component 1210 characterizes the instances "Philadelphia" and "Chicago" using values of the attributes "population" and "area." Structured component 1215 characterizes the instances "Philadelphia" and "Chicago" using values of the attributes "wins", "losses," and "GB (i.e., games behind)." Structured component 1220 characterizes the instances "Philadelphia" and "Chicago" using values of the attributes "year," "runtime," and "rating."

A system can select from the instances in structured components 1210, 1215, 1220 based on these characterized attributes. For example, the system can identify the correspondence between the attribute identifiers "year" and "rating" in preexisting structured presentation 106 and the attribute identifiers "year" and "rating" in structured component 1220 to select the instances "Peter Pan" and "Star Wars" as suggestions for addition to the preexisting structured presentation 106.

As discussed in the disclosure entitled "ADDING NEW ATTRIBUTES TO A STRUCTURED PRESENTATION" Ser. No. 12/355,607, a system can also suggest or add additional attribute identifiers. For example, structured component 1220 includes an attribute identifier "runtime." Such a system can thus suggest the attribute identifier "runtime" with or without the corresponding attribute values.

In some implementations, even if instances drawn from structured components 1210, 1215 are not suggested in a particular formulation, such instances can be stored for use during future information requests. For example, even through the cities represented in structured component 1210 are not selected as instance suggestions, these cities can be stored along with their respective attribute identifiers (e.g., "population" and "area") and attribute values in a data collection (such as, e.g., data center 208). When a subsequent user requests information regarding one or more cities, such a system can access this stored information and provide additional information to the user.

Figure 13:
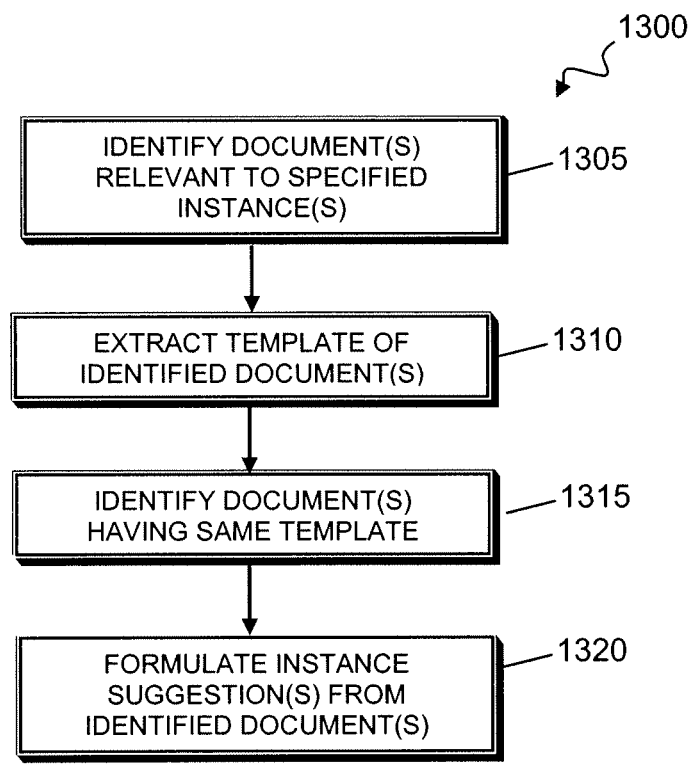
FIG. 13 is a flow chart of an example process for formulating instance suggestions from electronic documents in an electronic document collection based on characteristics of a preexisting structured presentation.

FIG. 13 is a flow chart of an example process 1300 for formulating instance suggestions from electronic documents in an electronic document collection based on characteristics of a preexisting structured presentation. Process 1300 can be performed alone or in conjunction with other activities. For example, process 1310 can be performed at step 1010 in process 1000 (FIG. 10).

Process 1300 can be performed by a system of one or more computer that perform operations by one or more sets of machine-readable instructions. For example, process 1310 can be performed by search engine 202 in system 200 (FIG. 2).

The system performing process 1300 can identify one or more documents relevant to one or more specified instances (step 1305). For example, the system performing process 1300 can use string comparisons to match one or more of the specified instances and their attributes and/or values with documents in an electronic document collection such as electronic document collection 102. As another example, the system performing process 1300 can access stored information (such as information in data center 208) to identify electronic documents that are relevant to the specified instances.

The system performing process 1300 can extract a template of one or more of the identified documents (step 1310). A document template serves as a pattern for the arrangement of the content of individual documents in a subcollection of documents in an electronic document collection. The documents in a subcollection generally originate from a single source, such as a single commercial entity. For example, a bookseller can use a single document template as a pattern for the arrangement of content describing different books. As another example, a furniture retailer can use a single document template as a pattern for the arrangement of the content of fliers for different sofas. For example, the template of an electronic flyer for a sofa can specify the arrangement, on the flyer, of the brand name of the sofa, a picture of the sofa, an interactive element that allows the user to select the color in which the sofa is shown, a description of the sofa in text format, and a table that characterizes the sofa's dimensions, availability, and price. Document templates can thus organize information regarding an instance in conformity with a defined structure, much like a structured presentation.

In general, a document template can serve as a pattern for the entire content of an electronic document and, as discussed above, can even specify the arrangement of a structured component in a document. However, because document templates only specify the arrangement of the content of a subcollection of documents in an unstructured electronic document collection, the electronic document collection itself remains unstructured. For example, even if AMAZON.COM uses one template as a pattern for the arrangement of a description of every book that AMAZON.COM sells, BARNESAND-NOBLE.COM and other booksellers do not necessarily use that same template as a pattern for the arrangement of descriptions of books that they sell. Moreover, a document template can be changed without that change necessarily being propagated throughout the entire collection, or even a subcollection, of electronic documents.

Figure 14:
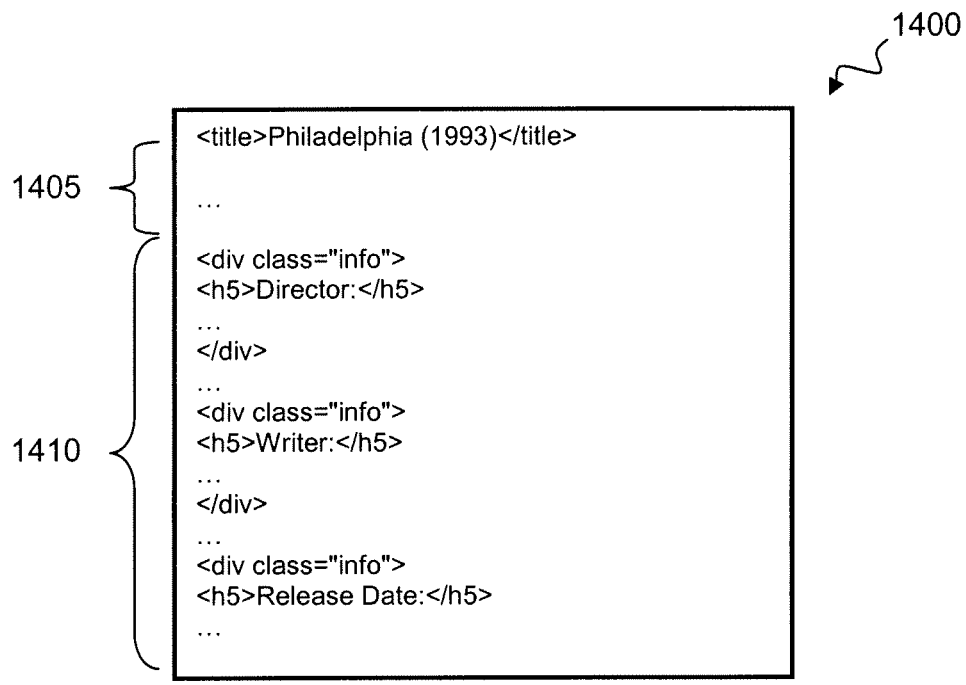
FIG. 14 is a representation of a portion of a hypertext markup language template that is used as a pattern for descriptions of a movie.

FIG. 14 is a representation of a portion of a hypertext markup language (HTML) template 1400 that is used as a pattern for descriptions of a movie (i.e., the movie "Philadelphia." The hypertext markup language (HTML) code of template portion 1400 is both machine-readable and human-readable. For example, the HTML code of template portion 1400 can be used by a browser to generate a web page.

In the depicted example, template portion 1400 is split into two subsections 1405, 1410. Subsection 1405 serves as a pattern for the arrangement of text that identifies the movie "Philadelphia." Subsection 1410 serves as a pattern for the arrangement of various attribute identifiers and their values. In general, the patterns in subsections 1405, 1410 are repeated a number of times in a particular subcollection of documents in an electronic document to describe different movies.

An HTML parser can be used to extract the formatting from template portion 1400 so the formatting can be used to identify documents having the same template. For example, the HTML tags <title>, <div>, other HTML tags, and their relative position to each other can be identified by an HTML parser. Such an HTML parser can determine that the HTML tag <title> appears before the HTML tag <div>. Thus, an HTML parser can extract the formatting from template portion 1400 from content that is arranged in accordance with the template.

Returning to FIG. 13, after extracting a template, the system performing process 1300 can identify one or more documents that have the same template (step 1315). For example, the system can compare the template of documents in the electronic document collection with the extracted template.

The system performing process 1300 can also formulate one or more instance suggestions from the documents identified as having the same template (step 1320). In particular, the system can use the repetition of the template within a subcollection of documents to infer that the documents in the subcollection include the same kind of content regarding the same category of instances. In other words, the system can infer that the context of two documents is the same since the same template serves as a pattern for the different documents.

Once documents of similar contexts have been identified, the templates themselves can be used to formulate the instance suggestions. For example, HTML tags in template portion 1400 (FIG. 14) identify that the title of the film described in that document is "Philadelphia (1993)." By searching for similarly-tagged text in documents that share the same template, the system can identify the titles of other films.

Moreover, in some implementations, additional content in a document template can be used in formulating instance suggestions. For example, the identification of a certain value (e.g., George Lucas) as a "director" can be used to select particular instance suggestions from a subcollection of documents. In other words, subsection 1410 of template portion 1400 can be parsed or otherwise analyzed to determine if any of the attributes have similar values, identifiers, or other characteristics. In such situations, the instance identifier can be extracted from subsection 1405.

Figure 15:
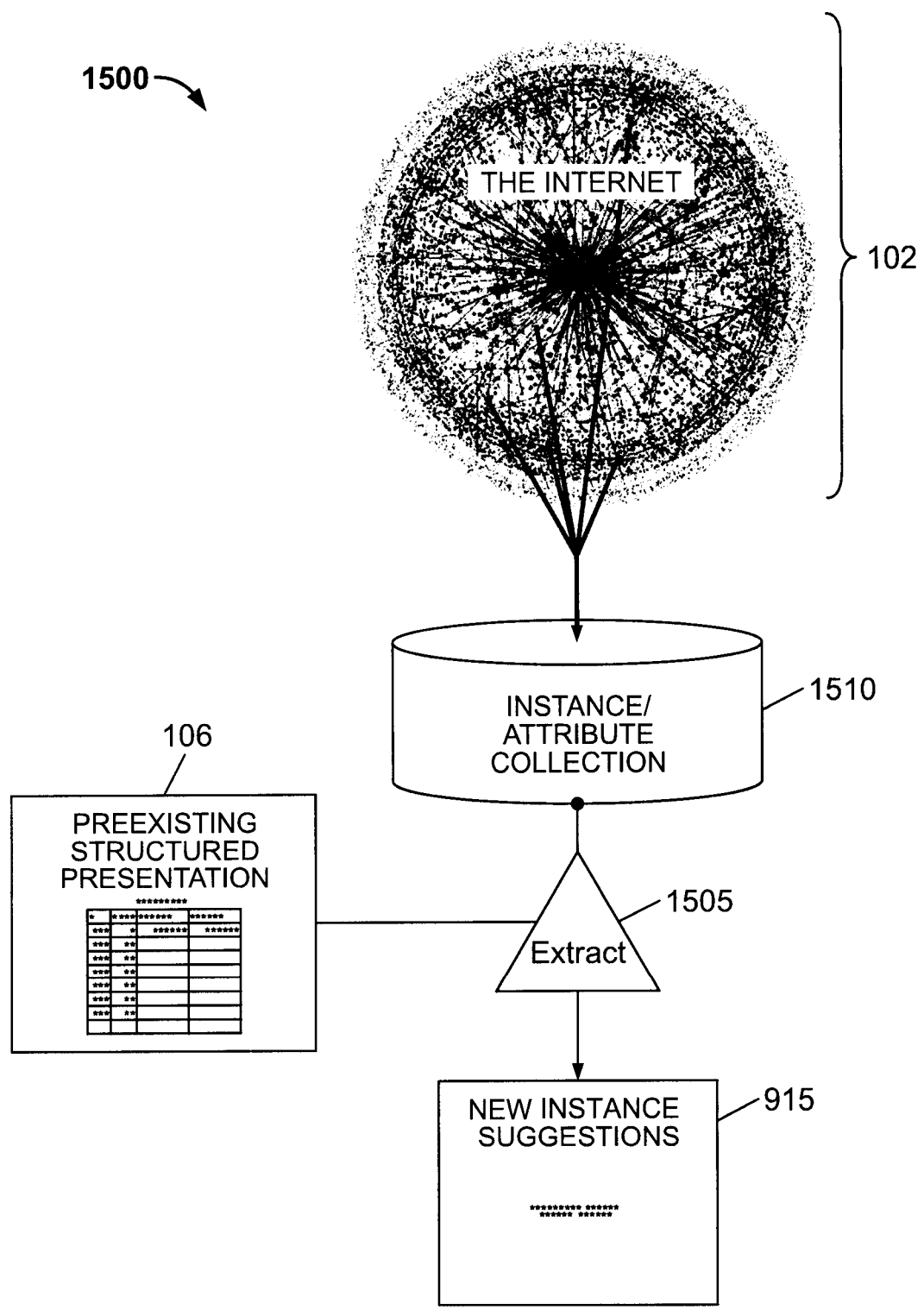
FIG. 15 is a schematic representation of a process by which a collection of new instance suggestions can be formulated based on information in a preexisting structured presentation.

FIG. 15 is a schematic representation of a process 1500 by which a collection of new instance suggestions 915 can be formulated based on information in a preexisting structured presentation 106. Process 1500 can be performed by a system of one or more computer that perform operations by one or more sets of machine-readable instructions (FIG. 2).

Process 1500 performs an extraction operation 1505 on an instance/attribute collection 1510 based on the information in the preexisting structured presentation 106. Instance/attribute collection 1510 is a collection of information that associates instances with their attributes and, in some implementation, with the values of those attributes as well. The information in collection 1510 can be extracted from documents in an electronic document collection 102 either in response to receipt of a trigger (such as a search query) or in anticipation of receipt of a trigger, e.g., as part of a process of indexing electronic document collection 102. In some implementations, information in collection 1510 can include the content of previous structured presentations that were presented to the current user or to other users. In general, the instance suggestions are provided to a user who selects instance suggestions to be added to a structured presentation, such as described in steps 1015, 1020, 1025 (FIG. 10).

Figures 16, 17:
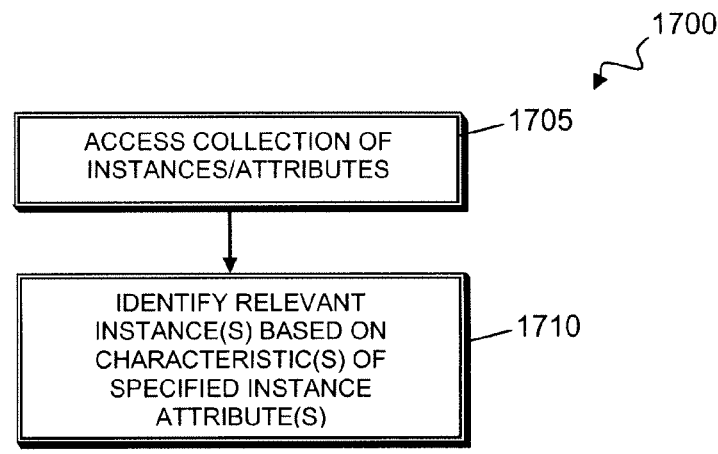
FIG. 16 is a schematic representation of a table that associates attributes and instances in an electronic document collection.
FIG. 17 is a flow chart of a process for formulating instance suggestions from a collection of instances and attributes based on characteristics of a preexisting structured presentation.

The association between instances and their attributes can be established in collection 1510 by structuring the information storage within collection 1510. FIG. 16 is a schematic representation of a table 1600 that associates attributes and instances in collection 1510. Table 1600 includes a collection of records 1602, 1604, 1606, 1608 1610, 1612, 1614, each of which associates an identifier of an instance with descriptions of a document location and the attributes that characterize the identified instances in those documents. The information in records 1602, 1604, 1606, 1608 1610, 1612, 1614 can be organized in a collection of columns 1615, 1620, 1625, 1630, 1635, 1640. In particular, column 1615 can include instance identifiers. Column 1620 can include a description of the location of an electronic document that includes the instance identified in column 1615. Columns 1625, 1630, 1635, 1640 can identify attributes that characterize the instances identified in column 1615 in the document whose location is described in column 1620.

As shown, different electronic documents can include different categories and amounts of information characterizing the same instance. For example, the document whose location is identified in column 1620 of record 1604 includes two attributes of an instance "INSTANCE_2," whereas the document whose location is identified in column 1620 of record 1610 includes three attributes of an instance "INSTANCE_2." Moreover, the attributes in record 1604 (i.e., attribute "ATTR_5" and attribute "ATTR_6") differ in part from the attributes in record 1610 (i.e., attribute "ATTR_5," attribute "ATTR_8," and attribute "ATTR_9.")

Data collections 1510 that associate attributes and instances (such as such as table 1600) can be formed in a number of different ways. For example, documents that include internal, structured components can be identified. Examples of such internal, structured components include tables and lists that appear in HTML documents. The relationships between attributes and instances in these internal structured components can be copied to form data collections 1510.

As another example, collection 1510 can be formed from the content of previous structured presentations that were presented to the current user or to other users.

As yet another example, once a first document has been identified as including attributes and instances, the template of that document can be used to extract attributes and instances from other documents that include the same template. For example, if a stereo retailer uses the same document template to describe different stereos that are offered for sale, the arrangement of information in a first electronic document regarding a first stereo can be used to extract information from other electronic documents that regard other stereos.

In some implementations, techniques such as natural language parsing can be used to identify instances and attributes. For example, electronic documents can be parsed to identify phrases such as "[Instance] has a/an [attribute]" in electronic documents.

In some implementations, data collection 1510 can categorize instances and their attributes. For example, instances and attributes can be categorized as North American cities, National League East teams, or popular movies. The storage of information in data collection 1510 can be based on such categorizations. For example, different categories can be stored in different files, records, or the like.

Returning to FIG. 15, process 1500 suggests one or more new instances based on information presented in the preexisting structured presentation 106. For example, if the structured presentation includes a number of instances corresponding to certain movies, the system 200 can suggest additional instance of movies according to information drawn from data collections 1510. That is, the system 200 can identify and suggest additional instances according to similarities of the attribute identifiers. For example, the system 200 may suggest movies that have similar show times, theaters, or run times.

FIG. 17 is a flow chart of a process 1700 for formulating instance suggestions from a collection of instances and attributes based on characteristics of a preexisting structured presentation. Process 1700 can be performed by a system of one or more computer that perform operations by one or more sets of machine-readable instructions. For example, process 1700 can be performed by the search engine 202 in system 200 (FIG. 2).

Process 1700 can be performed alone or in conjunction with other activities. For example, process 1700 can be performed during process 1500 (FIG. 15). As another example, process 1700 can be performed at step 1010 in process 1000 (FIG. 10), alone or in conjunction with one or both of processes 1100, 1300 (FIGS. 11, 13).

The system performing process 1700 can access a collection of instances and their attributes (step 1705). For example, the system performing process 1700 can access instance and attribute collection 1510 (FIG. 15) stored in data center 208 (FIG. 2).

The system performing process 1700 can identify one or more relevant instances based on characteristics of instance attributes specified in the preexisting structured presentation (step 1710). For example, the system can compare instance attributes of instances stored in the instance and attribute collection 1510 (FIG. 15) with instances specified in the structured presentation 106. The system can use the comparison to determine which, if any, of the stored instances share attribute identifiers, or related attributes, with the attributes specified in the preexisting structured presentation 106. For example, suppose that a preexisting structured presentation 106 uses the attributes "ATTR_3" and "ATTR_5" to characterize a collection of instances. Upon review of an instance and attribute collection 1510 such as table 1600 (FIG. 16), the system can suggest the instances "INSTANCE_1" and "INSTANCE_2" based on the same attributes "ATTR_3" and "ATTR_5" being used to characterize those instances in records 1602, 1606.

Figure 18:
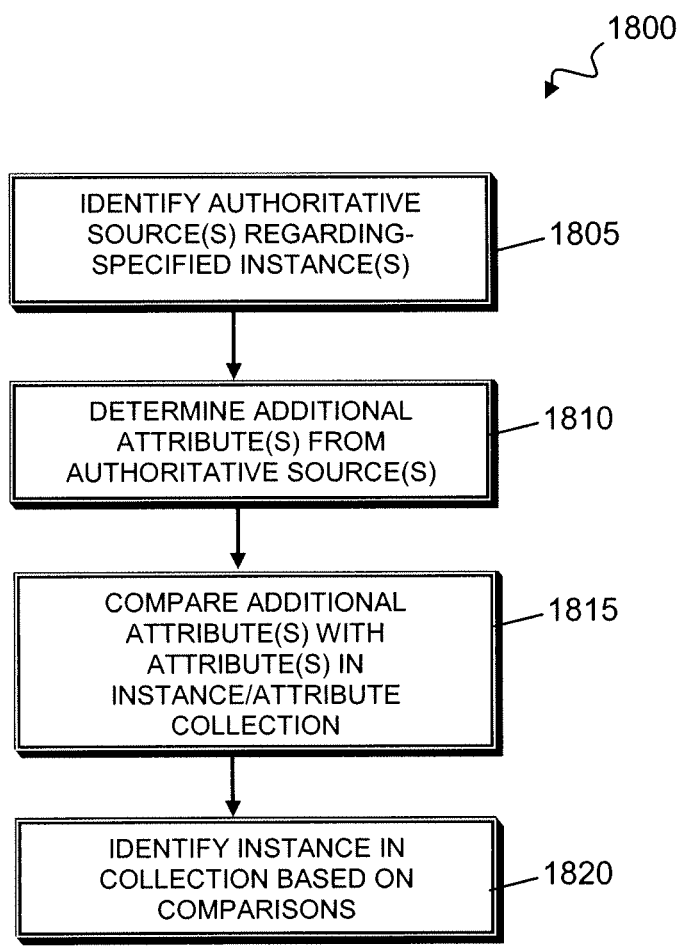
FIG. 18 is a flow chart of a process for formulating a collection of new instance suggestions based on information in a preexisting structured presentation.

FIG. 18 is a flow chart of a process 1800 for formulating a collection of new instance suggestions 915 based on information in a preexisting structured presentation 106. Process 1800 can be performed by a system of one or more computer that perform operations by one or more sets of machine-readable instructions, such as a system 200 (FIG. 2). Process 1800 can be performed alone or in conjunction with other activities. For example, process 1800 can be performed during process 1500 (FIG. 15). As another example, process 1800 can be performed at step 1010 in process 1000 (FIG. 10), alone or in conjunction with one or more of processes 1100, 1300, 1700 (FIGS. 11, 13, 17). In some implementations, process 1800 can be performed in response to receiving input (e.g., from a user of the system 200 or from another system or process). For example, process 1800 can be performed by search engine 202 in response to receiving a search string.

The system performing process 1800 can identify one or more authoritative sources regarding one or more specified instance (step 1805). For example, the system can access a collection of authoritative sources of documents in electronic document collection 102 that has been assembled, e.g., by a programmer.

As another example, the system can receive user-specific input identifying one or more authoritative sources of documents in electronic document collection 102 as "authoritative" in the view of that user. For example, a display screen 104 that displays a preexisting structured presentation 106 can include a GUI component that allows a viewer to specify authoritative sources of documents. The identification of an authoritative source can be received in conjunction with receipt of a search query. For example, a viewer can identify JD POWER AND ASSOCIATES, AMAZON.COM, and MAJOR LEAGUE BASEBALL as authoritative sources of the documents found at http://www.jdpower.com/, http://www.amazon.com/, and http://www.mlb.com/, respectively. In some implementations, the user-specific input can identify the subject mater on which a source is authoritative. For example, MAJOR LEAGUE BASEBALL may be identified as an authoritative source for baseball statistics, but may not be considered an authoritative source for information regarding drug testing.

As yet another example, the system performing process 1800 can analyze a collection of user-specific input identifying authoritative sources from multiple users to assemble a "generic" collection of authoritative sources. For example, a large number of users may identify the AMERICAN AUTOMOBILE ASSOCIATION (AAA) as authoritative. Based on a statistical analysis of these identifications, the AAA can then be added to a collection of authoritative sources.

The system performing process 1800 can determine additional attributes from the authoritative sources for instances that are specified in the preexisting structured presentation (step 1810). For example, the system can access documents provided by an authoritative source and identify one or more documents that characterize specified instances using one or more attributes. The system can extract attribute identifiers from these documents using a parser or other string comparison techniques.

As another example, the system can access a data collection that associates attributes and instances, such as such as table 1600 (FIG. 16). The system can filter records such as records 1602, 1604, 1606, 1608 1610, 1612, 1614 based on both the instances identified in the preexisting structured presentation and whether or not the documents whose location is identified in records 1602, 1604, 1606, 1608 1610, 1612, 1614 originated from an authoritative source. For example, if AMAZON.COM is an authoritative source, a collection that associates attributes and instances can be scanned to identify documents with the http://www.amazon.com/domain.

The system performing process 1800 can compare these additional attributes with attributes in an instance and attribute collection such as such as table 1600 (FIG. 16) (step 1815). For example, the system can use string comparisons, or other comparison techniques, to compare the additional attributes with attributes stored in the instance and attribute collection.

The system performing process 1800 can identify an instance in the instance and attribute collection based on the results of these comparisons (step 1820). For example, the system can determine the number of attributes that are used to characterize instances in documents from an authoritative source and the attributes that are associated with other instances in the instance and attribute collection.

FIG. 19 is a flow chart of a process 1900 for formulating a collection of new instance suggestions 915 based on information in a preexisting structured presentation 106. Process 1900 can be performed by a system of one or more computer that perform operations by one or more sets of machine-readable instructions, such as a system 200 (FIG. 2). Process 1900 can be performed alone or in conjunction with other activities. For example, process 1900 can be performed during process 1500 (FIG. 15). As another example, process 1900 can be performed at step 1010 in process 1000 (FIG. 10), alone or in conjunction with one or more of processes 1100, 1300, 1700, 1800 (FIGS. 11, 13, 17, 18). In some implementations, process 1900 can be performed in response to receiving input (e.g., from a user of the system 200 or from another system or process). For example, process 1900 can be performed by search engine 202 in response to receiving a search string.

The system performing process 1900 can identify one or more relevant instances based on attribute values of the instances specified in a preexisting structured presentation. For example, the system can identify relevant instances by comparing attribute values of specified instances with attribute values of other instances to determine if the other instances are suitable suggestions. Such comparisons can require, e.g., that the attribute values be identical or that the attribute values fall within a certain range. Such a range can be determined, e.g., based on the range of attribute values that are specified by a user over an interactive element or that already characterize instances in a preexisting structured presentation.

In some implementations, the system performing process 1900 can convert attribute values into a common unit of measurement prior to comparing the attribute values. For example, if the specified unit of measurement is in feet, but one or more extracted attribute values is in meters, the system can convert the values in meters into feet using conventional techniques. A schematic representation of one such approach is described in more detail below.

FIG. 20 is a schematic representation of a table 2000 that associates attributes, instances, and their values in data collection. Since table 2000 associates attributes and instances, table 2000 can also serve as instance/attribute collection 1510 (FIG. 15). Table 2000 can be generated based on information drawn from a collection of electronic documents, such as electronic document collection 102. Table 2000 can be generated, e.g., during a crawling process and stored, e.g., in data center 208 for subsequent use.

Table 2000 includes a collection of records 2002, 2004, 2006, 2008 2010, 2012, 2014, each of which associates an identifier of an instance with descriptions of a document location, attributes that characterize the identified instances in those documents, and values that characterize those attributes in those documents. The information in records 2002, 2004, 2006, 2008 2010, 2012, 2014 can be organized in a collection of columns 2015, 2020, 2025, 2030, 2035, 2040. In particular, column 2015 can include instance identifiers. Column 2020 can include a description of the location of an electronic document that includes the instance identified in column 2015. Columns 2025, 2035 can identify attributes that characterize the instances identified in column 1615 in the document whose location is described in column 1620. Columns 2030, 2040 can include values that characterize the attributes identified in columns 2025, 2035.

In the illustrated example, each record 2002, 2004, 2006, 2008 2010, 2012, 2014 relates to a different instance (e.g., INSTANCE_10 to INSTANCE_N). Each of the instances is characterized in at least one document by attribute identifiers ATTR_3, ATTR_6. As such, if instance suggestions were formulated based solely on the attributes that could be used to characterize INSTANCE_10 to INSTANCE_N, every INSTANCE_10 to INSTANCE_N could be suggested to a user.

In many circumstances, this is unacceptable. For example, it is likely that many of the same attributes (e.g., number of students, student/teacher ratio, location, etc.) of every college or university in the world is characterized in some electronic document available on the Internet. However, a list if suggestions that includes every college or university is of little assistance to a student who is looking for a school to attend.

Accordingly, as discussed above in process 1900 (FIG. 19), relevant instances can be identified by comparing the attribute values of the instances specified in a preexisting structured presentation with the attribute values of other instances. For example, if a specified instance in a structured presentation characterizes attribute "ATTR_3" of an instance with value "VAL_3" in units "unit_a" and attribute "ATTR_6" of an instance with value "VAL_6" in units "unit_c," then a system such as search engine 202 can identify that the instances identified in records 2002, 2006 (i.e., "INSTANCE_10" and "INSTANCE_12") can be suggested to a user based on their common values (albeit in different units). Thus, a system can convert the values in cells 2045, 2050 and 2055, 2060 into a common unit of measurement and compare those values to determine that they are similar. Thus, like instances can be selected even if the units in which those values are expressed are different.

Furthermore, although the instance identified in record 2008 (i.e., INSTANCE_13) shares a common value of attribute "ATTR_3" with a specified instance in a structured presentation, the instance identified in record 2008 need not be suggested to a user. In particular, the value that characterizes attribute "ATTR_6" of this instance is value "VAL_8," which differs from the value which characterizes this attribute of a specified instance in a structured presentation. On the basis of this difference, the instance identified in record 2008 can be excluded from a list if suggested instances.

Different criteria for including and excluding instances from a list of suggested instances can be used. For example, the number of attribute values that must be similar can differ. As another example, in some implementations, a user can specify the number and/or the nature of the attribute values that are considered in formulating a list of suggested instances. As yet another example, instances can be ranked based on the correspondence between their attribute values and the attribute values of one or more specified instances in a preexisting structured presentation. As yet another example, a range of values can be determined based on the values of characterizes the attributes of one or more instance specified in a structured presentation, and this range can be used to identify relevant instances for inclusion in a list of suggested instances.

As discussed in the disclosure entitled "RETRIEVING AND DISPLAYING INFORMATION FROM AN UNSTRUCTURED ELECTRONIC DOCUMENT COLLECTION," Ser. No. 12/355,228, in some implementations, a system can select from among a collection of different values based on criteria that reflect the likelihood that a value is appropriate. Examples of such include user-specified ranges, the number of documents that characterize an attribute with a certain value, and/or the quality of the documents that characterize an attribute with a certain value.

FIG. 21 is a flow chart of a process 2100 for formulating a collection of new instance suggestions 915 based on information in a preexisting structured presentation 106. Process 2100 can be performed by a system of one or more computer that perform operations by one or more sets of machine-readable instructions, such as a system 200 (FIG. 2). Process 2100 can be performed alone or in conjunction with other activities. For example, process 2100 can be performed during process 1500 (FIG. 15). As another example, process 2100 can be performed at step 1010 in process 1000 (FIG. 10), alone or in conjunction with one or more of processes 1100, 1300, 1700, 1800, 1900 (FIGS. 11, 13, 17, 18, 19). In some implementations, process 2100 can be performed in response to receiving input (e.g., from a user of the system 200 or from another system or process). For example, process 2100 can be performed by search engine 202 in response to receiving a search string.

The system performing process 2100 can access categorized collections of instances and attributes (step 2105). For example, the system can access the instance and attribute collection 1510 to access one or more categorized collections of instances and attributes generated during previous searches.

The system performing process 2110 can identify a category that includes the specified instances (step 2110). In some implementations, the system can identify the category that includes the instances based on similar attributes, similar attribute values, combinations of these characteristics, and/or other techniques.

The system performing process 2100 can select one or more instance suggestions from the identified category (step 2115). For example, in some implementations, instance suggestions can be selected from the identified category based on the similarity between attribute values of the specified instances and attribute vales of the instances in the category.

Figure 22:
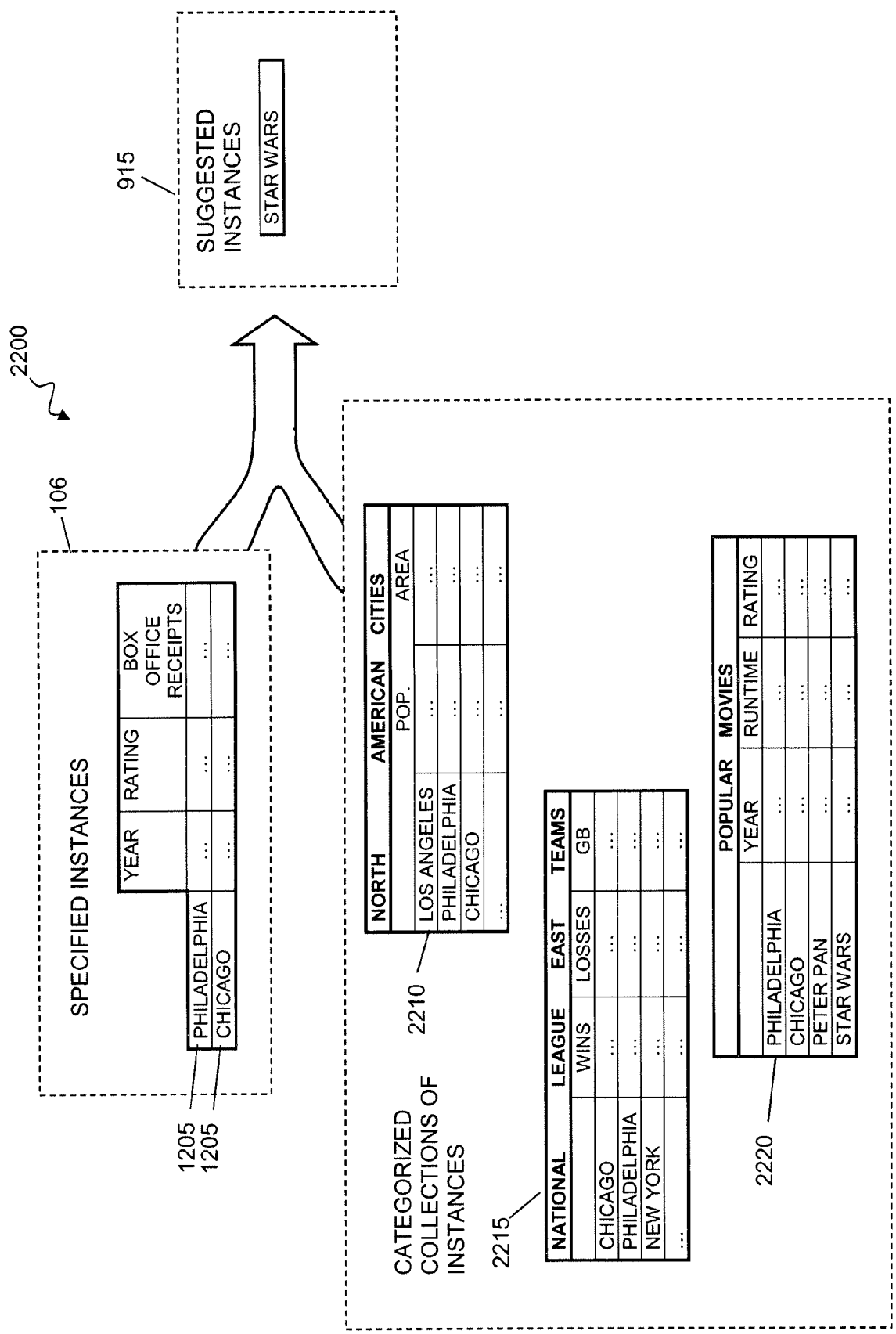
FIG. 22 is a representation of a formulation of instance suggestions from electronic documents in an electronic document collection based on characteristics of a preexisting structured presentation.

FIG. 22 is a representation 2200 of a formulation of instance suggestions from electronic documents in an electronic document collection based on characteristics of a preexisting structured presentation. In particular, representation 2200 illustrates a formulation of instance suggestions using one implementation of process 2100 (FIG. 21).

As shown, a preexisting structured presentation specifies a collection of instances 1205 (i.e., the instances "Philadelphia" and "Chicago.") Furthermore, instances drawn from different documents in an electronic document collection (e.g., collection 102) have been categorized into different collections 2210, 2215, 2220. Categorized instance collections 2210, 2215, 2220 can be identified as relevant to specified instances 1205 based on, e.g., the same instance identifiers "Philadelphia" and "Chicago" appearing therein.

As shown, categorized instance collections 2210, 2215, 2220 have been categorized in a variety of different ways. In particular, categorized instance collection 2210 has been categorized as a collection of "North American Cities." Categorized instance collection 2215 has been categorized as a collection of "National League East Teams." Categorized instance collection 2220 has been categorized as a collection of "Popular Movies." In the context of system 200, categorized instance collections 2210, 2215, 2220 can be stored in the data center 208 (FIG. 2). That is, the system 200 can generate one or more categories of instances based on previously received search strings. Thus, after search engine 202 conducts a search based on a search string, search engine 202 can categorize the results and store them in data center 208. These categorized results can be accessed and analyzed during subsequent searches to generate instance suggestions.

A categorized instance collection that includes the instances specified in a preexisting structured presentation can be identified, e.g., based on a similarity between the attributes that characterize the specified instances and the attributes that characterize the instances in the different categories. For example, the common use of the attributes "year" and "rating" the preexisting structured presentation and categorized instance collection 2220 can be used to identify that categorized instance collection 2220 includes instances 1205.

In some implementations, a subset of the instances in a categorized instance collection can be selected as instance suggestions based on the values that characterize the instances in a category. For example, the instance "Star Wars" can be included on a list of instance suggestions based on the value characterizing the "rating" attribute of "Star Wars"

being similar to the value characterizing the "rating" attribute of "Philadelphia" and "Chicago." As another example, the instance "Peter Pan" can be excluded on a list of instance suggestions based on the value characterizing the "rating" attribute of "Peter Pan" different from the value characterizing the "rating" attribute of "Philadelphia" and "Chicago."

Figure 23:
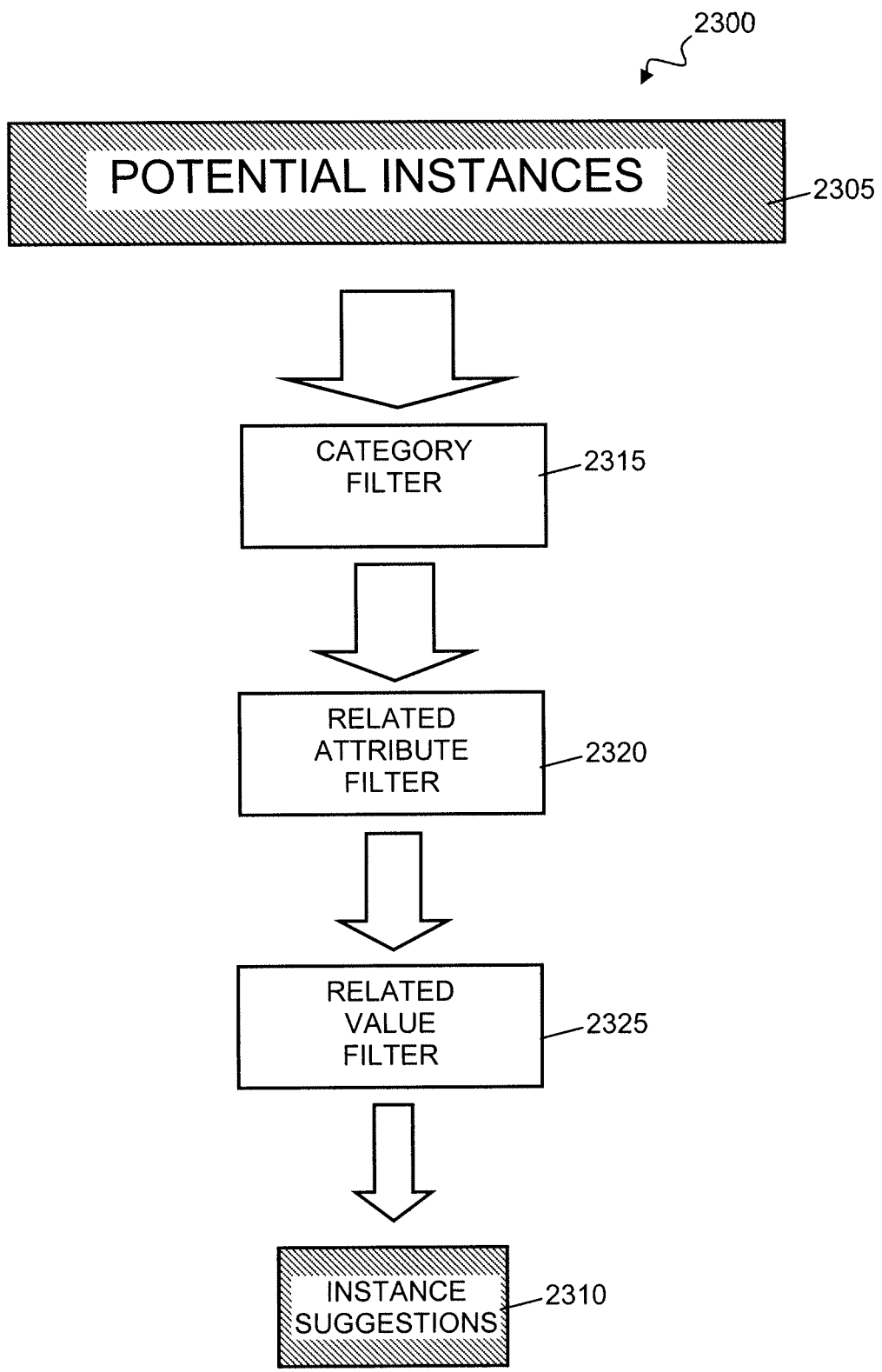
FIG. 23 is a schematic representation of a collection of processes that can be used to formulate a collection of new instance suggestions based on information in a preexisting structured presentation.

FIG. 23 is a schematic representation of a collection 2300 of processes that can be used to formulate a collection of new instance suggestions 915 based on information in a preexisting structured presentation 106.

The processes in collection 2300 can be thought of as filters that are applied in succession to a large collection of potential instances 2305 to yield a smaller collection 2310 of instance suggestions. Process collection 2300 includes a category filter 2315, a related attribute filter 2320, and a related value filter 2325. Category filter 2315 can include, e.g., aspects of process 2100 (FIG. 21). Related attribute filter 2320 can include, e.g., aspects of process 1100 (FIG. 11), aspects of process 1300 (FIG. 13), process 1700 (FIG. 17), and/or process 1800 (FIG. 18). Related value filter 2325 can include, e.g., aspects of process 1100 (FIG. 11), aspects of process 1300 (FIG. 13), process 1900 (FIG. 19), and/or aspects of process 2100 (FIG. 21). Each filter can exclude potential instances 2305 from an instance suggestion collection 2310 that can be presented to a user or added directly to a structured presentation.

Filters 2315, 2320, 2325 can be applied in any order. However, in general, filters 2315, 2320, 2325 are applied in order of granularity. In particular, the filter 2315, 2320, 2325 are that reduces the number of potential instances by the greatest amount is applied first and the filter 2315, 2320, 2325 are that reduces the number of potential instances by the smallest amount is applied last.

In some implementations, any of filters 2315, 2320, 2325 can be omitted from collection 2300 and/or additional filters added to collection 2300. For example, a user-specified filter that can filter the potential instances 2305 according to input provided by the user can be added to collection 2300.

Figure 24:
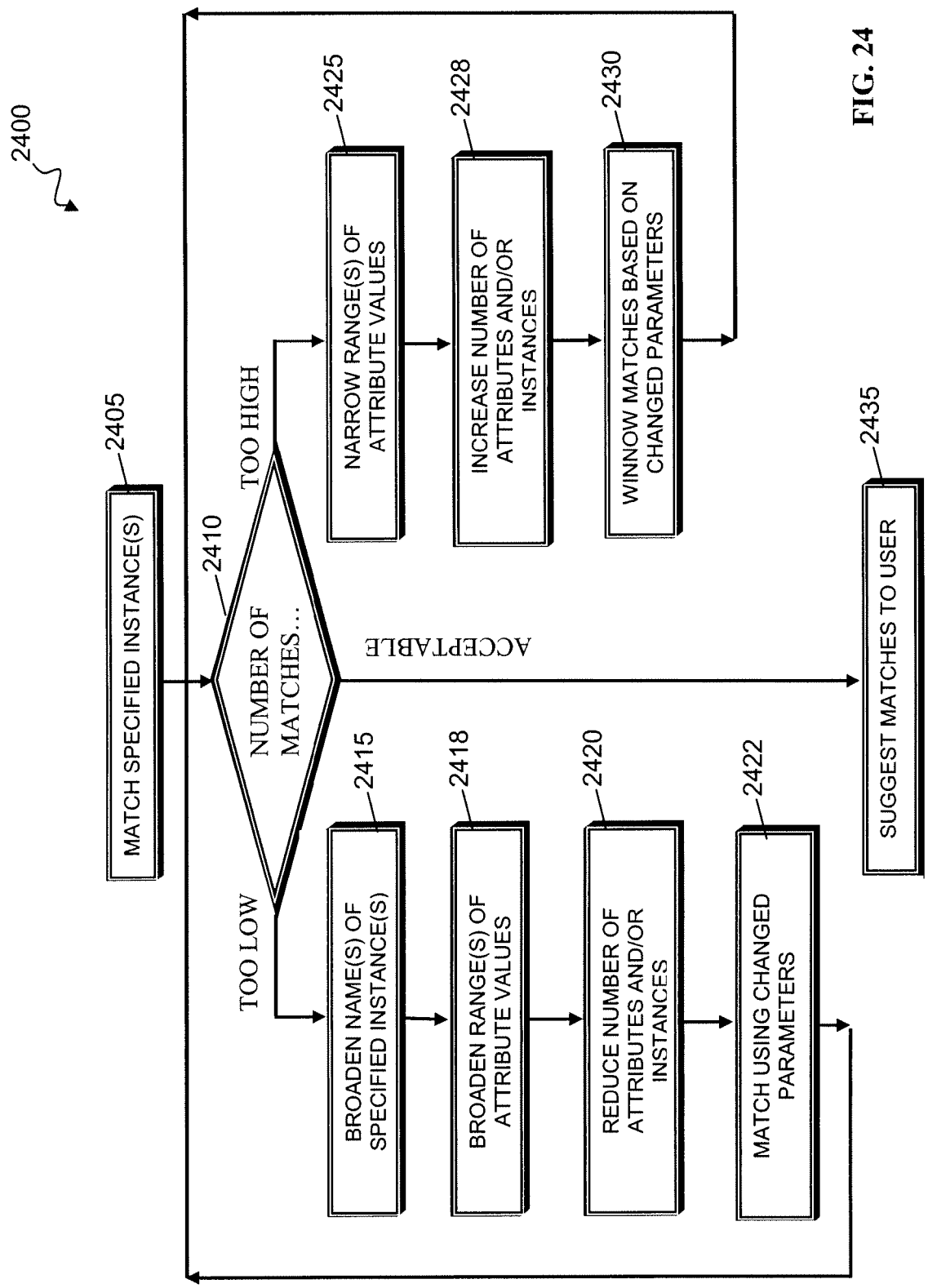
FIG. 24 is a flow chart of a process for formulating a collection of new instance suggestions based on information in a preexisting structured presentation.

FIG. 24 is a flow chart of a process 2400 for formulating a collection of new instance suggestions 915 based on information in a preexisting structured presentation 106. Process 2400 can be performed by a system of one or more computer that perform operations by one or more sets of machine-readable instructions, such as a system 200 (FIG. 2). Process 2400 can be performed alone or in conjunction with other activities. For example, process 2400 can be performed iteratively in conjunction with one or more of the processes in process collection 2300. In some implementations, process 2400 can be performed in response to receipt of a search string.

The system performing process 2400 can make an initial match between the instances specified in a preexisting structured presentation 106 and instances drawn from a document collection (2405). The initial match can be based on one or more of the filtering processes in process collection 2300.

The system performing process 2400 can determine whether the number of matches is too high, too low, or appropriate (step 2410). If the number of matches is too low, the system can broaden names of specified instances (step 2415). For example, the system performing process 2400 can user alternate spellings, abbreviations, synonyms, alternative names, nicknames, and/or other keywords for the specified instances in one or more of the processes in process collection 2300.

The system performing process 2400 can also broaden one or more ranges of attribute values used in any related value filtering 2325 (FIG. 23) (step 2418). The range can be broadened based on input received from a user or automatically, without user input. For example, in some implementations, the system can broaden a range based on the distribution of attribute values for a selected group of instances to, e.g., include a certain percentage of the instances or a predetermined number of instances The system performing process 2400 can also reduce the number of attributes and/or instances used in any related attribute filtering 2320 (FIG. 23) (step 2420). The number of attributes and/or instances can be reduced based on, e.g., the number of potential instances excluded by a particular attribute and/or instance. For example, if the requirement that a specific attribute be used the characterize potential instances excludes all of the potential instances, then this attribute can be omitted from any related attribute filtering. The attributes and/or instances to be removed can be determined, e.g., automatically, without user input, or based on input received from a user.

The system can again seek to make a match between the instances specified in a preexisting structured presentation 106 and instances drawn from a document collection, but this time using the changed parameters (step 2422). This match can also be made using one or more of the filtering processes in process collection 2300.

If number of matches is determined to be too high (step 2410), the system performing process 2400 can narrow one or more ranges of attribute values used in any related value filtering 2325 (FIG. 23) (step 2425). The range can be narrowed based on input received from a user or automatically, without user input. For example, in some implementations, the system can narrow a range based on the distribution of attribute values for a selected group of instances to, e.g., exclude a certain percentage of the instances or a predetermined number of instances.

The system performing process 2400 can also increase the number of attributes and/or instances used in any related attribute filtering 2320 (FIG. 23) (step 2428). The number of attributes and/or instances can be increased based on, e.g., the number of potential instances excluded by a particular attribute and/or instance. The attributes and/or instances to be added can be determined, e.g., automatically, without user input, or based on input received from a user.

The system performing process 2400 can winnow the matches based on the changed parameters (step 2430). In particular, the narrowed ranges and/or increased numbers of attributes and/or instances can be used in any related value filtering 2325 (FIG. 23).

If the number of matches is determined to be acceptable (step 2410), the system performing process 2400 can suggest the matched instances to a user (2435). For example, the system performing process 2400 can present one or more instances suggestions in a GUI on a display screen such as display screen 104.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a stand alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processor suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. Accordingly, other implementations are within the scope of the following claims.

What is claimed is:
1. A machine-implemented method comprising:
receiving, at the machine, description data describing a preexisting structured presentation, a visual presentation of the preexisting structured presentation visually presenting information in a systematic arrangement that conforms with a structured design, the preexisting structured presentation characterizing attributes of a particular instance by virtue of an arrangement of an identifier of the particular instance and values that characterize the attributes of the particular instance in the visual presentation of the preexisting structured presentation;

comparing, by the machine, textual characteristics of the preexisting structured presentation with textual content of electronic documents in an unstructured collection of electronic documents to locate electronic documents that identify a new instance that is relevant to the preexisting structured presentation;

adding, by the machine, an identifier of the new instance to the preexisting structured presentation to form an expanded structured presentation, wherein adding the identifier of the new instance comprises formulating a collection of instance suggestions, wherein formulating the collection of instance suggestions comprises identifying a first document in the electronic document collection that includes an identifier of an instance identified in the preexisting structured presentation and that is arranged in accordance with a template, identifying a second document that is arranged in accordance with the template but relevant to a second instance, and including the second instance in the instance suggestion collection; and outputting, from the machine, instructions for presenting the expanded structured presentation on a display device.

2. The method of claim 1, wherein adding the identifier of the new instance further comprises:

providing the instance suggestion collection to a user; and receiving a user selection of the new instance, wherein the new instance is in the collection of instance suggestions.

3. The method of claim 2, wherein comparing the textual characteristics of the preexisting structured presentation with the textual content of the electronic documents comprises identifying documents in the electronic document collection that include structured components related to instances identified in the preexisting structured presentation.

4. The method of claim 1, wherein comparing the textual characteristics of the preexisting structured presentation with the textual content of the electronic documents comprises identifying documents in the electronic document collection that include information regarding one or more instances identified in the preexisting structured presentation.

5. The method of claim 1, wherein comparing the textual characteristics of the preexisting structured presentation with the textual content of the electronic documents comprises locating the new instance in a stored collection of associations of instances with attributes.

6. The method of claim 1, wherein comparing the textual characteristics of the preexisting structured presentation with the textual content of the electronic documents comprises comparing attributes characterized in the preexisting structured presentation with the textual content of the electronic documents.

7. The method of claim 1, wherein comparing the textual characteristics of the preexisting structured presentation with the textual content of the electronic documents comprises comparing identifiers of attributes used to characterize instances in the preexisting structured presentation with the textual content of the electronic documents.

8. The method of claim 1, wherein comparing the textual characteristics of the preexisting structured presentation with the textual content of the electronic documents comprises comparing identified values of attributes used to characterize instances in the preexisting structured presentation with the content of the electronic documents.

9. The method of claim 1, wherein comparing the textual characteristics of the preexisting structured presentation with the textual content of the electronic documents comprises comparing a category of instances that includes instances identified in the preexisting structured presentation with the textual content of the electronic documents.

10. The method of claim 1, wherein:

the collection of electronic documents comprises the electronic documents available on the Internet; and the electronic documents comprise web pages.

11. The method of claim 1, wherein the expanded structured presentation comprises a table.

12. The method of claim 1, wherein the expanded structured presentation comprises a collection of cards.

13. The method of claim 1, further comprising visually presenting the expanded structured presentation on a display screen, including physically transforming one or more elements of the display screen.

14. An apparatus comprising one or more machine-readable data storage memory devices storing instructions operable to cause one or more data processing machines to perform operations, the operations comprising:

formulating a collection of instance suggestions based on textual content of two or more documents in an unstructured electronic document collection by comparing textual characteristics of a preexisting structured presentation with textual content of electronic documents in the electronic document collection, wherein the electronic document collection is unstructured in that the format of the electronic documents in the electronic document collection is neither restrictive nor permanent and wherein formulating the instance suggestion collection comprises:

identifying a first document in the electronic document collection that is relevant to an instance identified in the preexisting structured presentation and that is arranged in accordance with a template, identifying a second document that is arranged in accordance with the template but relevant to a second instance, and including the second instance in the instance suggestion collection;

providing the instance suggestion collection to a user;

receiving a user selection of a first instance in the collection of instance suggestions; and adding an identifier of the first instance suggestion to a structured presentation presented on a display device, wherein a visual presentation of the structured presentation visually presents information in an organized arrangement, the structured presentation characterizing attributes of a particular instance by virtue of an arrangement of an identifier of the particular instance and values that characterize the attributes of the particular instance in the visual presentation of the structured presentation.

15. The apparatus of claim 14, wherein formulating the collection of instance suggestions comprises identifying documents in the electronic document collection that include structured components related to instances identified in the preexisting structured presentation.

16. The apparatus of claim 14, wherein formulating the collection of instance suggestions comprises identifying documents in the electronic document collection that include identifiers of one or more instances in the preexisting structured presentation.

17. The apparatus of claim 14, wherein formulating the collection of instance suggestions comprises identifying additional attributes used to characterize instances in the preexisting structured presentation.

18. The apparatus of claim 14, wherein formulating the collection of instance suggestions comprises comparing values of attributes used to characterize instances in the preexisting structured presentation with values of the instance suggestions.

19. The apparatus of claim 14, wherein formulating the collection of instance suggestions comprises:
identifying a category of instances that includes instances in the preexisting structured presentation; and
formulating the collection of instance suggestions using instances in the category of instances.

20. The apparatus of claim 14, wherein formulating the collection of instance suggestions comprises identifying the instance suggestions in a stored collection of associations of instances with attributes.

21. The apparatus of claim 14, wherein formulating the collection of instance suggestions comprises comparing the attributes characterized in the preexisting structured presentation with the textual content of the documents in the unstructured electronic document collection.

22. The apparatus of claim 14, wherein:
the collection of electronic documents comprises the documents available on the Internet; and
the electronic documents comprise web pages.

23. The apparatus of claim 14, wherein the structured presentation comprises a table.

24. The apparatus of claim 14, wherein the structured presentation comprises a collection of cards.

25. A system comprising:
a client device; and
one or more computers programmed to interact with the client device and to perform operations comprising:
receiving description data describing a preexisting structured presentation, a visual presentation of the preexisting structured presentation visually presenting information in a systematic arrangement that conforms with a structured design, the structured presentation characterizing attributes of a particular instance by virtue of an arrangement of an identifier of the particular instance and values that characterize the attributes of the particular instance in the visual presentation of the preexisting structured presentation;
comparing textual characteristics of the preexisting structured presentation with textual content of electronic documents in an unstructured collection of electronic documents to locate electronic documents that identify a new instance that is relevant to the preexisting structured presentation;
adding an identifier of the new instance to the preexisting structured presentation to form an expanded structured presentation, wherein adding the identifier of the new instance comprises formulating a collection of instance suggestions, wherein formulating the collection of instance suggestions comprises
identifying a first document in the electronic document collection that includes an identifier of an instance identified in the preexisting structured presentation and that is arranged in accordance with a template,
identifying a second document that is arranged in accordance with the template but relevant to a second instance, and
including the second instance in the instance suggestion collection; and outputting instructions for presenting the expanded structured presentation on a display device coupled in data communication with the client device.

26. The system of claim 25, wherein adding the identifier of the new instance further comprises:
providing the instance suggestion collection to a user; and
receiving a user selection of the new instance,
wherein the new instance is in the collection of instance suggestions.

27. The system of claim 25, wherein comparing the textual characteristics of the preexisting structured presentation with the textual content of the electronic documents comprises identifying documents in the electronic document collection that include structured components related to instances identified in the preexisting structured presentation.

28. The system of claim 25, wherein comparing the textual characteristics of the preexisting structured presentation with the textual content of the electronic documents comprises identifying documents in the electronic document collection that include information regarding one or more instances identified in the preexisting structured presentation.

29. The system of claim 25, wherein comparing the textual characteristics of the preexisting structured presentation with the textual content of the electronic documents comprises locating the new instance in a stored collection of associations of instances with attributes.

30. The system of claim 25, wherein comparing the textual characteristics of the preexisting structured presentation with the textual content of the electronic documents comprises comparing attributes characterized in the preexisting structured presentation with the textual content of the electronic documents.

31. The system of claim 25, wherein comparing the textual characteristics of the preexisting structured presentation with the textual content of the electronic documents comprises comparing identifiers of attributes used to characterize instances in the preexisting structured presentation with the textual content of the electronic documents.

32. The system of claim 25, wherein comparing the textual characteristics of the preexisting structured presentation with the textual content of the electronic documents comprises comparing identified values of attributes used to characterize instances in the preexisting structured presentation with the content of the electronic documents.

33. The system of claim 25, wherein comparing the textual characteristics of the preexisting structured presentation with the textual content of the electronic documents comprises comparing a category of instances that includes instances identified in the preexisting structured presentation with the textual content of the electronic documents.

34. The system of claim 25, wherein:
the collection of electronic documents comprises the electronic documents available on the Internet; and
the electronic documents comprise web pages.

35. The system of claim 25, wherein the expanded structured presentation comprises a table.

36. The system of claim 25, wherein the expanded structured presentation comprises a collection of cards.

37. The system of claim 25, further comprising visually presenting the expanded structured presentation on a display screen, including physically transforming one or more elements of the display screen.

38. A system comprising:
a client device; and
one or more computers programmed to interact with the client device and to perform operations comprising:

formulating a collection of instance suggestions based on textual content of two or more documents in an unstructured electronic document collection by comparing textual characteristics of a preexisting structured presentation with textual content of electronic documents in the electronic document collection, wherein the electronic document collection is unstructured in that the format of the electronic documents in the electronic document collection is neither restrictive nor permanent and wherein formulating the instance suggestion collection comprises:
- identifying a first document in the electronic document collection that is relevant to an instance identified in the preexisting structured presentation and that is arranged in accordance with a template,
- identifying a second document that is arranged in accordance with the template but relevant to a second instance, and
- including the second instance in the instance suggestion collection;

providing the instance suggestion collection to a user using the client device;

receiving a user selection of a first instance in the collection of instance suggestions; and adding an identifier of the first instance suggestion to a structured presentation presented on a display device coupled in data communication with the client device, wherein a visual presentation of the structured presentation visually presents information in an organized arrangement, the structured presentation characterizing attributes of a particular instance by virtue of an arrangement of an identifier of the particular instance and values that characterize the attributes of the particular instance in the visual presentation of the structured presentation.

39. The system of claim 38, wherein:
the one or more computers comprise a server operable to interact with the client device through a data communication network, and the client device is operable to interact with the server as a client;
the client device comprises a personal computer running a web browser; and
the personal computer comprises the display device.

40. The system of claim 38, wherein formulating the collection of instance suggestions comprises identifying documents in the electronic document collection that include structured components related to instances identified in the preexisting structured presentation.

41. The system of claim 38, wherein formulating the collection of instance suggestions comprises identifying documents in the electronic document collection that include identifiers of one or more instances in the preexisting structured presentation.

42. The system of claim 38, wherein formulating the collection of instance suggestions comprises identifying additional attributes used to characterize instances in the preexisting structured presentation.

43. The system of claim 38, wherein formulating the collection of instance suggestions comprises comparing values of attributes used to characterize instances in the preexisting structured presentation with values of the instance suggestions.

44. The system of claim 38, wherein formulating the collection of instance suggestions comprises:
identifying a category of instances that includes instances in the preexisting structured presentation; and
formulating the collection of instance suggestions using instances in the category of instances.

45. The system of claim 38, wherein formulating the collection of instance suggestions comprises identifying the instance suggestions in a stored collection of associations of instances with attributes.

46. The system of claim 38, wherein formulating the collection of instance suggestions comprises comparing the attributes characterized in the preexisting structured presentation with the textual content of the documents in the unstructured electronic document collection.

47. The system of claim 38, wherein:
the collection of electronic documents comprises the documents available on the Internet; and
the electronic documents comprise web pages.

48. The system of claim 38, wherein the structured presentation comprises a table.

49. The system of claim 38, wherein the structured presentation comprises a collection of cards.

* * * * *

UNITED STATES PATENT AND TRADEMARK OFFICE
CERTIFICATE OF CORRECTION

PATENT NO. : 8,452,791 B2  
APPLICATION NO. : 12/355554  
DATED : May 28, 2013  
INVENTOR(S) : Vinicius J. Fortuna et al.

Page 1 of 1

It is certified that error appears in the above-identified patent and that said Letters Patent is hereby corrected as shown below:

Title Page, Column 2, Line 1, Item (56) in the listing of Other Publications, delete "Inrementally" and insert -- Incrementally --.

Title Page, Column 2, Line 2, Item (56) in the listing of Other Publications, delete "Unstructure" and insert -- Unstructured --.

Title Page 3, Column 1, Line 7, Item (56) in the listing of Other Publications, delete "mining." and insert -- mining: --.

Title Page 3, Column 2, Lines 16-17, Item (56) in the listing of Other Publications, delete "(http://deg.byu.edu/papers/e198.pdf)," and insert -- (http://deg.byu.edu/papers/er98.pdf), --.

Signed and Sealed this  
First Day of April, 2014

Michelle K. Lee  
*Deputy Director of the United States Patent and Trademark Office*